US012663588B2

(12) United States Patent　　(10) Patent No.: US 12,663,588 B2
Guan et al.　　(45) Date of Patent:　Jun. 23, 2026

(54) HIGH-POWER MULTIPLEXER AND DEMULTIPLEXER FOR HOLLOW CORE FIBER DENSE WAVELENGTH-DIVISION MULTIPLEXING (DWDM) APPLICATIONS

(71) Applicant: Microsoft Technology Licensing, LLC, Redmond, WA (US)

(72) Inventors: Binbin Guan, Issaquah, WA (US); Jamie Gaudette, Kirkland, WA (US); Yawei Yin, Redmond, WA (US); Denizcan Billor, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 18/478,422

(22) Filed: Sep. 29, 2023

(65) Prior Publication Data

US 2025/0110280 A1　Apr. 3, 2025

(51) Int. Cl.
　G02B 6/293　　(2006.01)
　G02B 6/27　　(2006.01)
　　(Continued)
(52) U.S. Cl.
　CPC ......... G02B 6/2938 (2013.01); G02B 6/2706 (2013.01); G02B 6/2773 (2013.01);
　　(Continued)
(58) Field of Classification Search
　CPC .. G02B 6/2938; G02B 6/2706; G02B 6/2773; G02B 6/29311; G02B 6/32; G02B 17/002
　See application file for complete search history.

(56) References Cited

U.S. PATENT DOCUMENTS 8,320,769 B2　11/2012　Essiambre et al.
2003/0058520 A1*　3/2003　Yu ...................... G02B 6/29395
　　　　　　　359/291
(Continued)

FOREIGN PATENT DOCUMENTS

CN　　105717069 A　6/2016
CN　　105700069 B　9/2018
(Continued)

OTHER PUBLICATIONS

Mihailov, et al., "Bragg grating inscription in various optical fibers with femtosecond infrared lasers and a phase mask", In Journal of Optical Materials Express, vol. 1,No. 4, Jul. 29, 2011, pp. 754-765.
(Continued)

*Primary Examiner* — Tina Wong

(57)　　ABSTRACT

A high-power multiplexer/demultiplexer ("mux/demux") and a three-dimensional ("3D") printed phase mask are provided for hollow-core optical fiber applications. The high-power mux/demux includes hollow core optical fiber interfaces configured to couple with free-space optical fiber cables, a diffraction grating, a 3D printed phase mask, and a set of lenses. The diffraction grating is configured, based on different wavelengths, either to at least diffract each optical signal of a plurality of optical signals having different wavelengths into two or more optical signals or to at least diffract a single optical signal having multiple wavelengths into a plurality of optical signals. The phase mask includes reflective features configured to reflect optical signals at different optical path lengths to provide reflected optical signals with different phases. The set of lenses is configured to collimate optical signals onto or from the diffraction grating or to focus optical signals onto or from the phase mask.

20 Claims, 15 Drawing Sheets

(51) Int. Cl.
  *G02B 6/32*    (2006.01)
  *G02B 17/00*   (2006.01)

(52) U.S. Cl.
  CPC ............ *G02B 6/29311* (2013.01); *G02B 6/32*
     (2013.01); *G02B 17/002* (2013.01)

(56)      References Cited

U.S. PATENT DOCUMENTS

| | | | |
|---|---|---|---|
| 2005/0194514 A1* | 9/2005 | Izumi ................. | G02B 6/29358 |
| | | | 250/201.9 |
| 2008/0273560 A1* | 11/2008 | Stelmakh .............. | H01S 3/2383 |
| | | | 372/26 |
| 2015/0141854 A1 | 5/2015 | Eberle et al. | |
| 2016/0231489 A1 | 8/2016 | Divliansky et al. | |
| 2016/0358623 A1* | 12/2016 | Ogata ................... | G11B 7/125 |
| 2020/0064189 A1 | 2/2020 | Islam | |
| 2020/0073054 A1 | 3/2020 | Yang | |
| 2022/0146754 A1* | 5/2022 | Schiffer ............. | G02B 6/29308 |

FOREIGN PATENT DOCUMENTS

| | | |
|---|---|---|
| CN | 110915078 B | 10/2021 |
| CN | 115720114 A | 2/2023 |

OTHER PUBLICATIONS

Wang, et al., "Orbital angular momentum beams generated by passive dielectric phase masks and their performance in a communication link", In Journal of Optics Letters, vol. 42, No. 14, Jul. 15, 2017, pp. 2746-2749.

International Search Report and Written Opinion received for PCT Application No. PCT/US2024/046295, mailed on Oct. 13, 2025, 18 pages.

Labroille, et al., "Efficient and mode selective spatial mode multiplexer based on multi-plane light conversion", In Journal of Optics Express, vol. 22, Issue 13, Jun. 30, 2014, pp. 15599-15607.

International Preliminary Report on Patentability (Chapter I) Received for PCT Application No. PCT/US2024/046295, Mailed on Apr. 9, 2026, 12 Pages.

* cited by examiner

Mux/Demux

Phase Mask

2D Array

HIGH-POWER MULTIPLEXER AND DEMULTIPLEXER FOR HOLLOW CORE FIBER DENSE WAVELENGTH-DIVISION MULTIPLEXING (DWDM) APPLICATIONS

BACKGROUND

Hollow core fibers for use with dense wavelength-division multiplexing ("DWDM") applications enables high power laser utilization. However, existing phase mask technologies for multiplexer/demultiplexer ("mux/demux") implementations are unable to support such high-power laser utilization. It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for a high-power mux/demux using a three-dimensional ("3D") printed phase mask for hollow-core optical fiber applications. The high-power mux/demux includes a first hollow core optical fiber interface configured to couple with a first free-space optical fiber cable and a set of second hollow core optical fiber interfaces configured to couple with a corresponding set of second free-space optical fiber cables. The high-power mux/demux further includes a diffraction grating configured either to at least diffract each optical signal of a plurality of optical signals each having different wavelengths into two or more optical signals based on the different wavelengths or to at least diffract a single optical signal having multiple wavelengths into a plurality of optical signals based on different wavelengths. The high-power mux/demux also includes a 3D printed phase mask having an incident surface including a plurality of reflective features configured to reflect a corresponding plurality of optical signals having different wavelengths at different optical path lengths to provide the reflected corresponding plurality of optical signals with different phases. The high-power mux/demux further includes a set of lenses configured to collimate optical signals onto or from the diffraction grating or to focus optical signals onto or from the 3D printed phase mask.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

DETAILED DESCRIPTION OF CERTAIN EMBODIMENTS

Figure 1A:
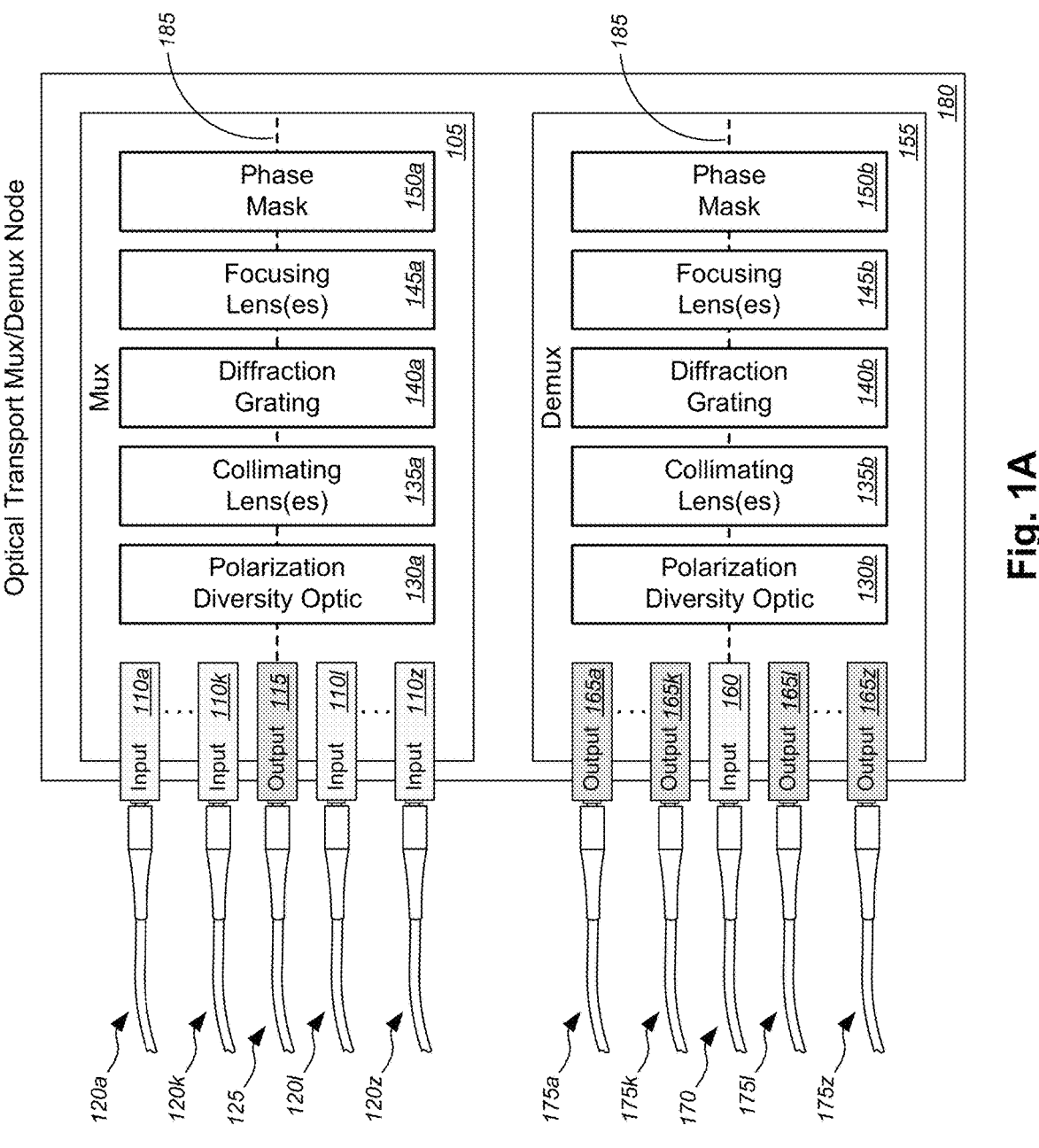
FIGS. 1A and 1B depict various example systems including optical transport mux/demux nodes.

As briefly discussed above, conventional muxes and demuxes used in hollow core optical fiber applications may be ill-suited to high power laser utilizations that can be afforded by hollow core optical fiber implementations. Such conventional muxes and demuxes are typically made of materials that are ill-suited for high power applications, and typically lack precise control over the phase and amplitude of light waves, which results in suboptimal transmission quality in hollow core optical fiber applications. Electronic or optical switching methods typically relied upon by such devices are also generally incompatible or ill-suited for high power laser utilizations, where the components of such electronic or optical switching methods tend to become damaged with user high power lasers.

A high-power mux/demux is provided that uses a 3D printed phase mask for hollow-core fiber applications. The high-power mux/demux incorporates a passive beam steering mechanism including a 3D printed phase mask that functions as a steering plate. The phase mask is made of a superior-quality material (e.g., fused silica, fused quartz, silicon dioxide, or metallic material), allowing it to endure high power levels. Its design enables precise control over the phase and amplitude of light waves traversing the hollow core fiber, ensuring greater reliability compared to active solutions (e.g., electronic or optical switching solutions). Additionally, the high-power mux/demux offers a physical mechanical means for switching between frequency grids, providing enhanced flexibility and precision in wavelength selection.

Utilizing a 3D printed phase mask offers several advantages compared to conventional multiplexers and demultiplexers. First, it enables higher power handling due to the exceptional material quality of the phase mask, which can withstand increased power levels. Second, it delivers a precise and consistent method for manipulating the phase and amplitude of light waves, a critical aspect for achieving optimal transmission quality in hollow core fibers. As compared with conventional wavelength selective switching ("WSS") based technologies or array waveguide technologies that utilize such electronic or optical switching methods, for example, the high-power mux/demux has a greater capacity to manage high power levels, based at least on the material quality of the 3D printed phase mask. Another notable difference is that the beam steering in the high-power mux/demux is a primarily passive solution, which offers greater reliability compared to the active mechanisms found in WSSs and array waveguides. Additionally, the high-power mux/demux incorporates a physical mechanism for transitioning between channel plans or wavelength grids (e.g., by using a mechanism for inserting and swapping various phase plates tailored to specific frequency grid applications), in contrast to the electronic or optical switching methods typically utilized by WSSs and array waveguides. This mechanical approach to switching enables superior flexibility and precision in wavelength selection, as well as enhanced flexibility in designing the mux/demux, as diverse frequency grids can be swapped and employed for distinct purposes. Consequently, the high-power mux/demux featuring the 3D printed phase mask described herein represents a substantial improvement over existing WSS and array waveguide technologies, offering increased power handling capabilities, enhanced reliability, and a more adaptable and accurate mechanism for selecting wavelength channels.

The high-power mux/demux described herein possesses a broad array of applications within the fiber optics domain, encompassing telecommunications, data centers, and scientific research. The high-power mux/demux signifies a considerable advancement over existing technologies, offering a dependable, efficient, and cost-effective device and technique for transmitting and receiving high-power optical signals via hollow core fibers.

Various modifications and additions can be made to the embodiments discussed without departing from the scope of the disclosed techniques. For example, while the embodiments described above refer to particular features, the scope of the disclosed techniques also includes embodiments having different combination of features and embodiments that do not include all of the above-described features.

We now turn to the embodiments as illustrated by the drawings. FIGS. 1-5 illustrate some of the features of methods, systems, and apparatuses for implementing hollow core fiber optic communication, and, more particularly, to methods, systems, and apparatuses for implementing high-power mux and demux for hollow core fiber DWDM applications, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

Figure 1B:
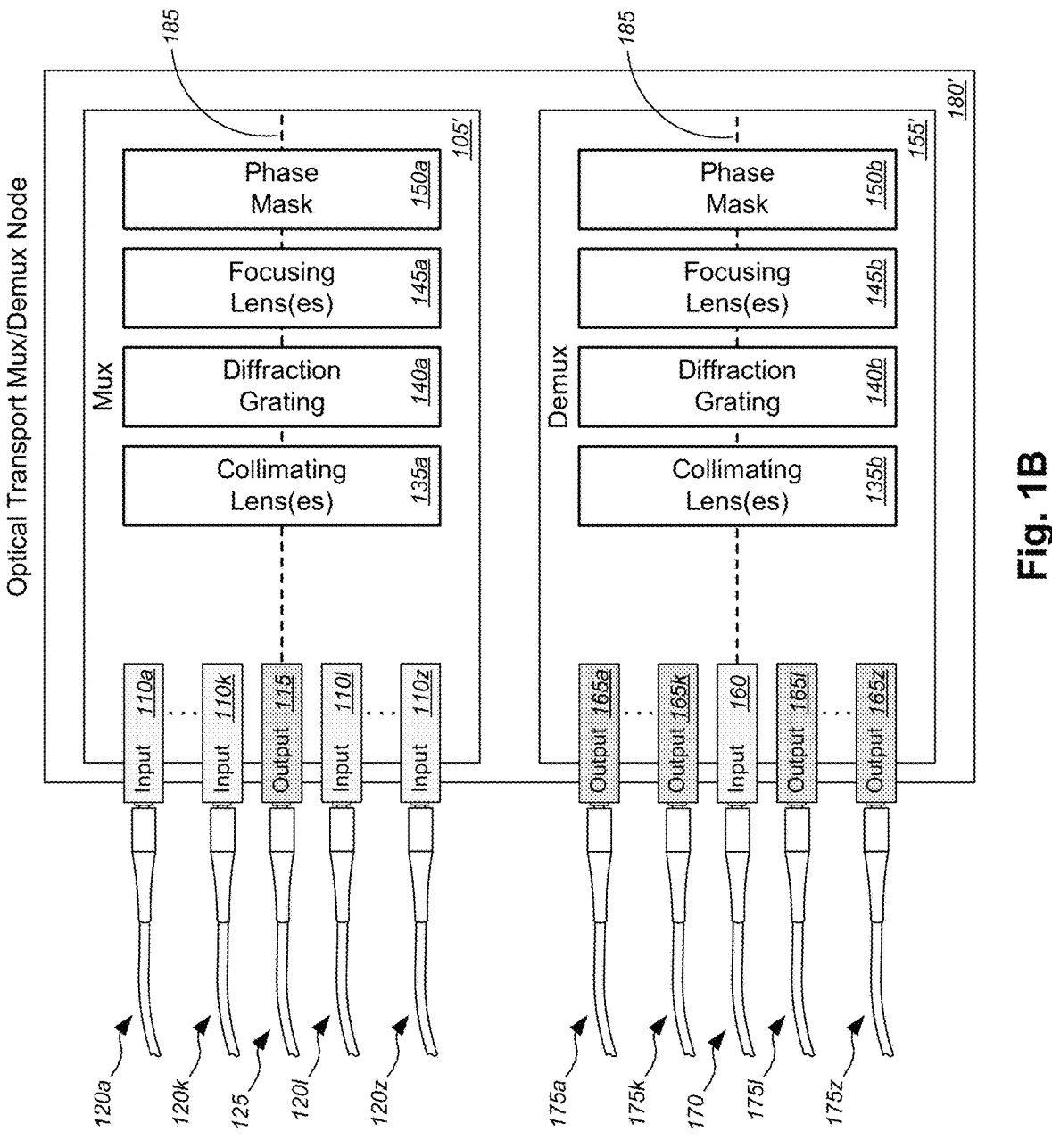

FIGS. 1A and 1B depict various example systems 100A and 100B including optical transport mux/demux nodes 180 and 180'. With reference to FIG. 1A, example system 100A includes mux 105 including a set of hollow core optical fiber interfaces 110a-110z (collectively, "hollow core optical fiber interfaces 110" or "fiber interfaces 110"; each referred to as "Input" in FIGS. 1A and 1B) each configured to couple with one of a corresponding set of free-space optical ("FSO") fiber cables 120a-120z (collectively, "FSO fiber cables 120" or "fiber cables 120") and hollow core optical fiber interface 115 (referred to as "Output" in FIGS. 1A and 1B) configured to couple with an FSO fiber cable 125. In some examples, the fiber interfaces 110 and 115 are similar, if not identical, to each other in terms of structure and function. Likewise, fiber cables 120 and 125 are similar, if not identical, to each other in terms of structure and function. In examples, fiber interfaces 110 and 115 each includes an optical transmitter or receiver port into which a corresponding fiber cable 120 or 125 removably connects. An FSO fiber cable (also referred to as a "hollow-core optical fiber cable" or "hollow-core optical fiber"), as used herein, refers to an optical fiber cable having a hollow core (or air core or vacuum core) instead of a solid core of glass. Hollow-core optical fiber enables increased overall speed and lower latency as light travels through the hollow-core optical fiber cable faster than through silica glass of solid core optical fiber cables. Hollow-core optical fiber also reduces, minimizes, or eliminates fiber non-linearities (in which photons interact with silicon atoms of glass cores) and has a broader spectrum, thus lowering costs and increasing bandwidth and enhancing network quality. Hollow-core optical fiber may also allow for ultra-low signal loss enabling deployment over longer distances without repeaters. With an air core (or a vacuum core) instead of a solid glass core, hollow-core optical fibers can be operated at higher laser power, where such higher laser power may potentially burn, melt, and/or damage solid core optical fibers. Higher laser power enables improved signal to noise characteristics, while also enabling longer distance signal transmission without use of signal repeaters.

In examples, mux 105 further includes polarization diversity optic 130a, one or more collimating lenses 135a, diffraction grating 140a, one or more focusing lenses 145a, and 3D printed phase mask 150a. Similarly, demux 155 further includes polarization diversity optic 130b, one or more collimating lenses 135b, diffraction grating 140b, one or more focusing lenses 145b, and 3D printed phase mask 150b. Polarization diversity optic 130b, one or more collimating lenses 135b, diffraction grating 140b, one or more focusing lenses 145b, and 3D printed phase mask 150b are similar, if not identical, to polarization diversity optic 130a, one or more collimating lenses 135a, diffraction grating 140a, one or more focusing lenses 145a, and 3D printed phase mask 150a, respectively. Demux 155 further includes hollow core optical fiber interface 160 (referred to as "Input" in FIGS. 1A and 1B) configured to couple with an FSO fiber cable 170 and a set of hollow core optical fiber interfaces 165a-165z (collectively, "hollow core optical fiber interfaces 165" or "fiber interfaces 165"; each referred to as "Output" in FIGS. 1A and 1B) each configured to couple with one of a corresponding set of FSO fiber cables 175a-175z (collectively, "FSO fiber cables 175" or "fiber cables 175"). In some examples, the fiber interfaces 160 and 165 are similar, if not identical, to each other (and to fiber interfaces 110 and 115) in terms of structure and function. Likewise, fiber cables 170 and 175 are similar, if not identical, to each other (and to fiber cables 120 and 125) in terms of structure and function. Mux 105 and Demux 155 are structurally similar, if not identical, to each other and differ in terms of its operation at time of use (i.e., in mux mode or in demux mode). Although the various examples are described with respect to use of hollow core optical fiber ("HCF") cables, in some examples, single-mode optical fiber ("SMF") cables may be used in place of fiber cables 120, 125, 170, and/or 175 described above, for the mux/demux described herein.

In some examples, polarization diversity optic 130a/130b is configured either (A) to separate each of a plurality of incoming optical signals having different polarizations into multiple optical signals based on the different polarizations and/or to combine a plurality of optical signals having different phases and having different polarizations into a single outgoing optical signal (in mux mode) or (B) to separate a single incoming optical signal into different optical signals based on different polarizations and/or to combine two or more optical signals having different polarizations but having the same phase into one of a plurality of combined optical signals (in demux mode). The one or more collimating lenses 135a/135b are configured to collimate optical signals onto or from the diffraction grating 140a/140b. The diffraction grating 140a/140b is configured either (1) to at least diffract each optical signal of a plurality of optical signals each having different wavelengths into two or more optical signals based on the different wavelengths (in mux mode) or (2) to at least diffract a single optical signal having multiple wavelengths into a plurality of optical signals based on different wavelengths (in demux mode). In examples, in the mux mode, the diffraction grating 140a diffracts each of a plurality of incoming signals into multiple optical signals based on different wavelengths and/or diffracts and combines two or more optical signals having different phases and having different wavelengths into a single outgoing optical signal. In examples, in the demux mode, the diffraction grating 140b diffracts a single incoming optical signal having multiple wavelengths into a plurality of outgoing optical signals based on different wavelengths and/or diffracts each of a plurality of optical signals each having multiple wavelengths as a plurality of outgoing optical signals, based on the different wavelengths, toward corresponding hollow core optical fiber interfaces. The one or more focusing lenses 145a/145b are configured to focus optical signals onto or from the 3D printed phase mask 150a/150b. The 3D printed phase mask 150a/150b (also referred to as a "phase shifting mask") has an incident surface including a plurality of reflective features that extends from, is arranged on, is 3D printed on, is set on, and/or is set in the incident surface of the phase mask. In some examples, the entire phase mask (e.g., base or substrate, incident surface, and reflective features) is 3D printed. The plurality of reflective features is configured to reflect a plurality of optical signals having different wavelengths at different optical path lengths to provide a reflected corresponding plurality of optical signals with different phases. Examples of reflective features of the phase mask are shown, and described below, with respect to FIGS. 4B, 4C, 4E, 4F, 4H, 4I, 4K, 4L, and 5A-5F.

Figures 4A, 4B, 4C:
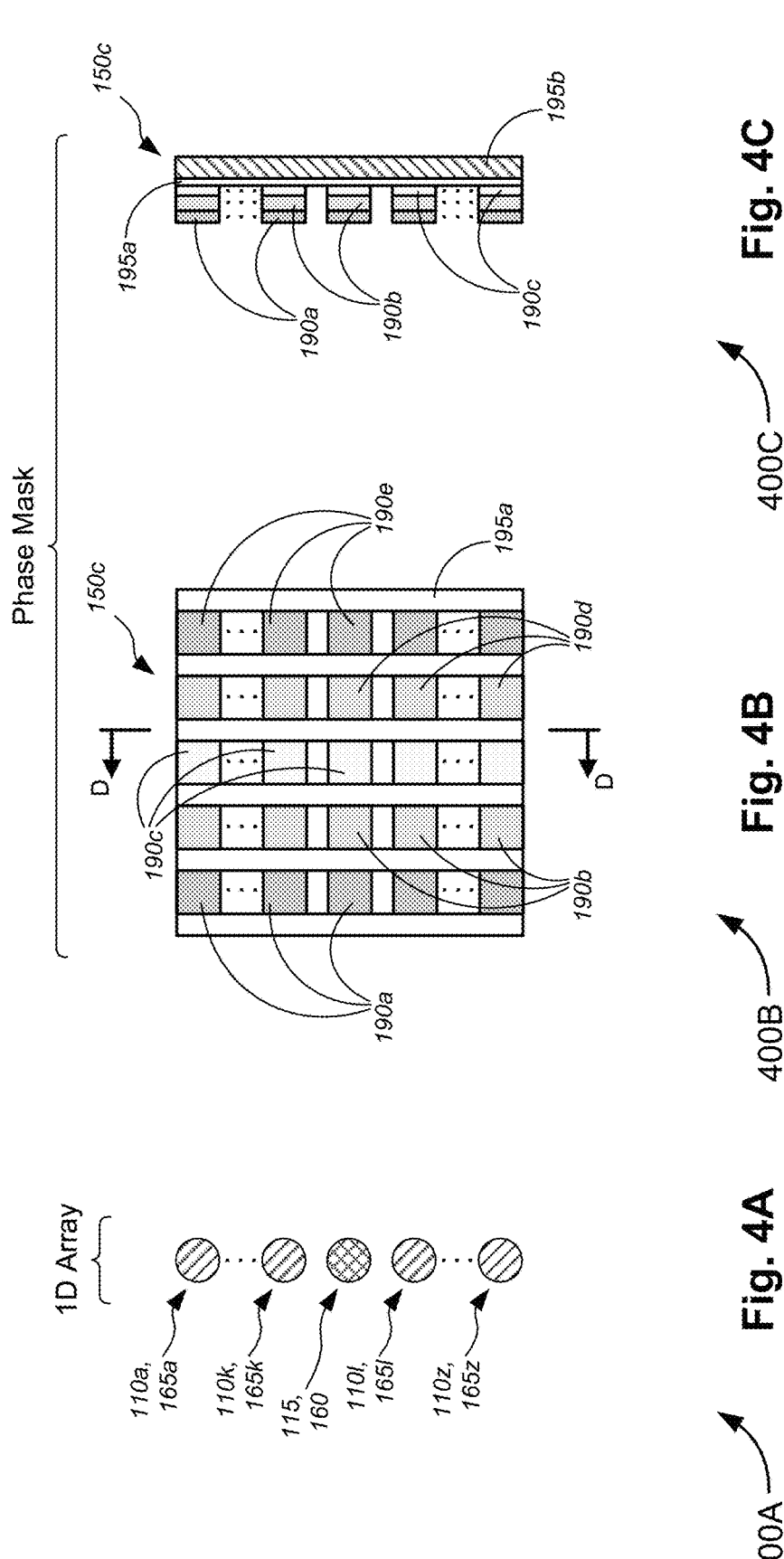
FIGS. 4A-4F depict sets of an example 1D array of hollow core optical fiber interfaces and a corresponding example 3D printed phase mask for a mux/demux.

In examples, the fiber interfaces 110 and 115 are arranged in an array (e.g., a 1D array or a 2D array, as shown in FIGS. 4A/4D and 4G/4J, respectively) with fiber interface 115 being disposed in a central portion of the array surrounded on each of two sides or on each of multiple sides by fiber interfaces 110. Axis 185 extends from or along an axis of fiber interface 115 and/or a central portion of the array, through components of mux 105 (e.g., polarization diversity optic 130a, one or more collimating lenses 135a, diffraction grating 140a, one or more focusing lenses 145a, and 3D printed phase mask 150a). Similarly, the fiber interfaces 160 and 165 are arranged in an array (e.g., a 1D array or a 2D array, as shown in FIGS. 4A/4D and 4G/4J, respectively) with fiber interface 160 being disposed in a central portion of the array surrounded on each of two sides or on each of multiple sides by fiber interfaces 165. Axis 185 extends from or along an axis of fiber interface 160 and/or a central portion of the array, through components of demux 155 (e.g., polarization diversity optic 130b, one or more collimating lenses 135b, diffraction grating 140b, one or more focusing lenses 145b, and 3D printed phase mask 150b).

In examples, the mux/demux 105/155 includes 3D printed phase masks 150a/150b that are interchangeable, such that a phase mask that is tailored for a specific application may be replaced with another phase mask that is tailored for another specific application as desired. Any suitable mechanism for ease of swapping phase masks may be used. In an example, the end portion (e.g., an end cap or end panel) of the mux/demux 105/155 that is closest to the 3D printed phase mask 150a/150b may be configured to removably attach to the main body of the mux/demux 105/155 via suitable fastener(s) (e.g., screws, bolts, clasps, magnetic fasteners, latches, clips, threaded end cap or end panel), while the 3D printed phase mask may be mounted to an interior portion of the main body of the mux/demux 105/155 via suitable fastener(s) or interior mounts. In an example, each component of the mux/demux (e.g., polarization diversity optic 130a/130b, one or more collimating lenses 135a/135b, diffraction grating 140a/140b, one or more focusing lenses 145a/145b, and 3D printed phase mask 150a/150b) may be mounted on interior mounts that stack against each other separated by spacers, with at least one spring loaded spacer that fit within the main body of the mux/demux and that are held in place by the at least one spring loaded spacer and the end portion of the mux/demux 105/155.

In some examples, multiple different 3D printed phase masks each tailored for a specific application may be disposed within the mux/demux, with a phase mask exchange system that is also disposed within the mux/demux and that is configured to exchange or swap one 3D printed phase mask for another phase mask among the multiple different 3D printed phase masks. In an example, the multiple different 3D printed phase masks may be mounted on a rotatable carousel that is configured to rotate about its central axis that is parallel with axis 185. The mounts for the phase masks may be disposed around the central axis of the rotatable carousel, the central axis being offset from the axis 185 such that a central portion of each mount aligns with the axis 185 when the rotatable carousel is rotated such that said mount holding the corresponding phase mask is rotated to align with the other components of the mux/demux. In another example, the multiple different 3D printed phase masks may be mounted on stackable mounts, with each mount being configured to hold one of the multiple different 3D printed phase masks and being further configured to be rotatable about a shaft that is parallel with the axis 185. In some cases, when in operation, all the mounts except for an "in-position" mount are rotated such that these mounts are offset from the other components of the mux/demux, while the "in-position" mount is rotated such that a central portion aligns with axis 185. In some instances, the stackable mounts are set on a movable track that moves along a direction that is parallel with the axis of the shaft and parallel with axis 185. That is, even though each mount (and thus the corresponding 3D printed phase mask mounted thereon), when in a stationary position, is at a different distance relative to a reference position corresponding to one of the components in the mux/demux compared with other mounts, when a mount is rotated into position to align with the other components, the stackable mounts may be moved along the movable track so that the distance between the "in-position" 3D printed phase mask is adjustable. Accordingly, despite swapping phase masks, each phase mask, when set "in-position," may be set at the same relative position compared with the other components of the mux/demux. This axial direction shifting may also be used to adjust focal lengths of the phase mask that is "in-position" when necessary.

Referring to FIG. 1B, example system 100B is similar, if not identical, to example system 100A of FIG. 1A, except that the mux 105' and the demux 155' of example system 100B do not include polarization diversity optic 130a and 130b, respectively, of mux 105 and demux 155 of example system 100A.

Figure 2A:
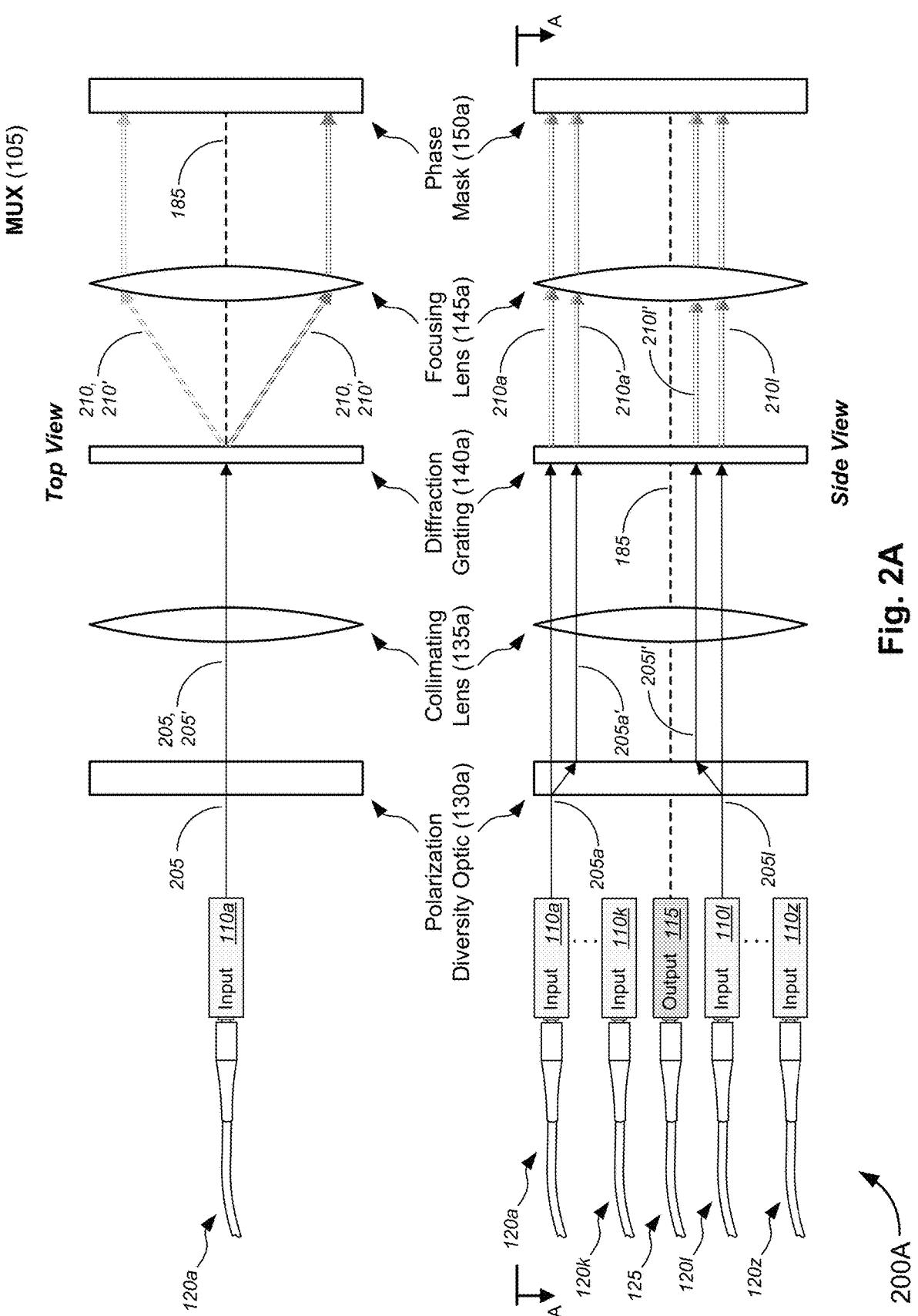
FIGS. 2A and 2B depict example optical arrangement(s) for an example high-power mux and components for implementing hollow core fiber DWDM applications.
Figure 2B:
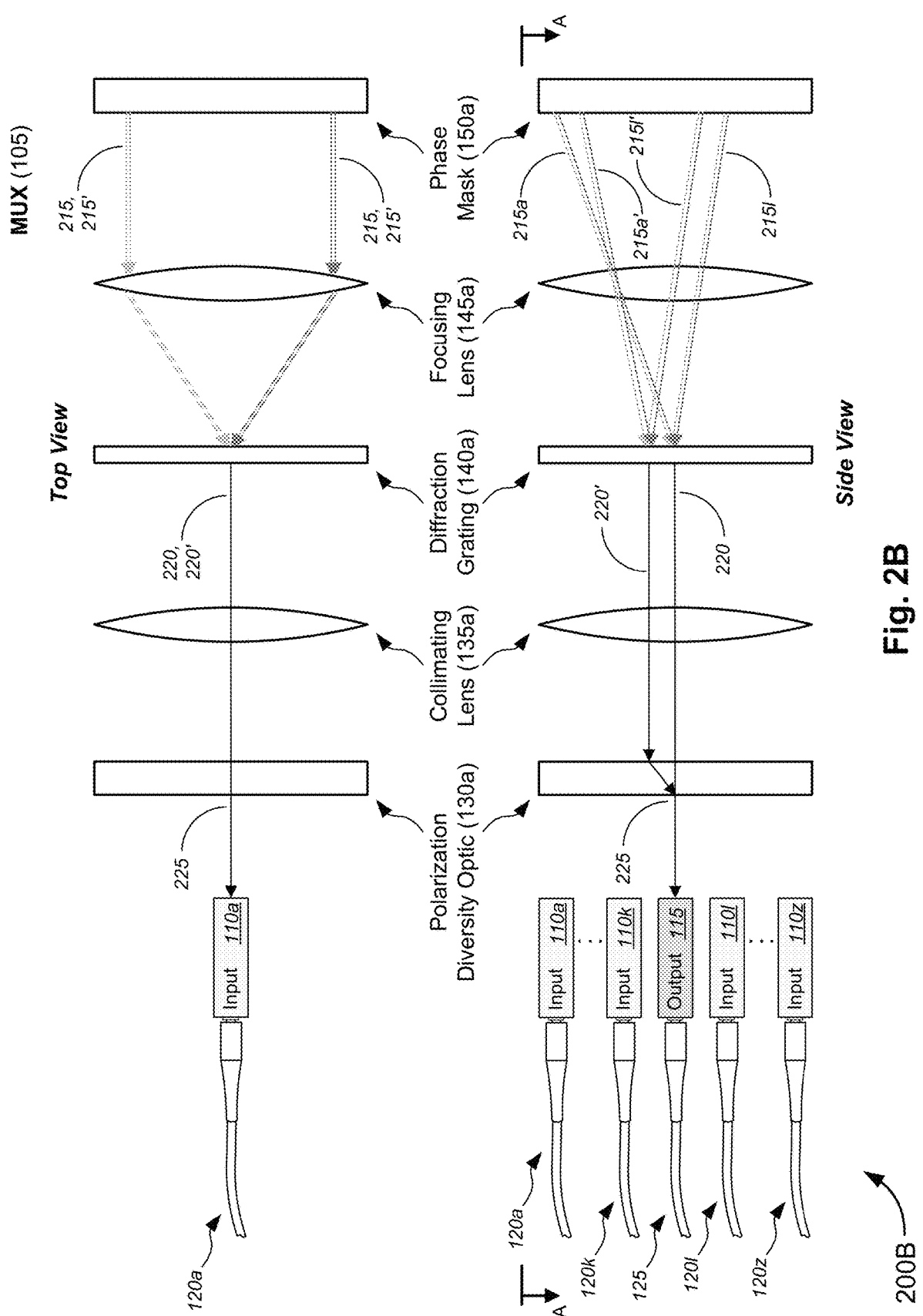
Figure 2C:
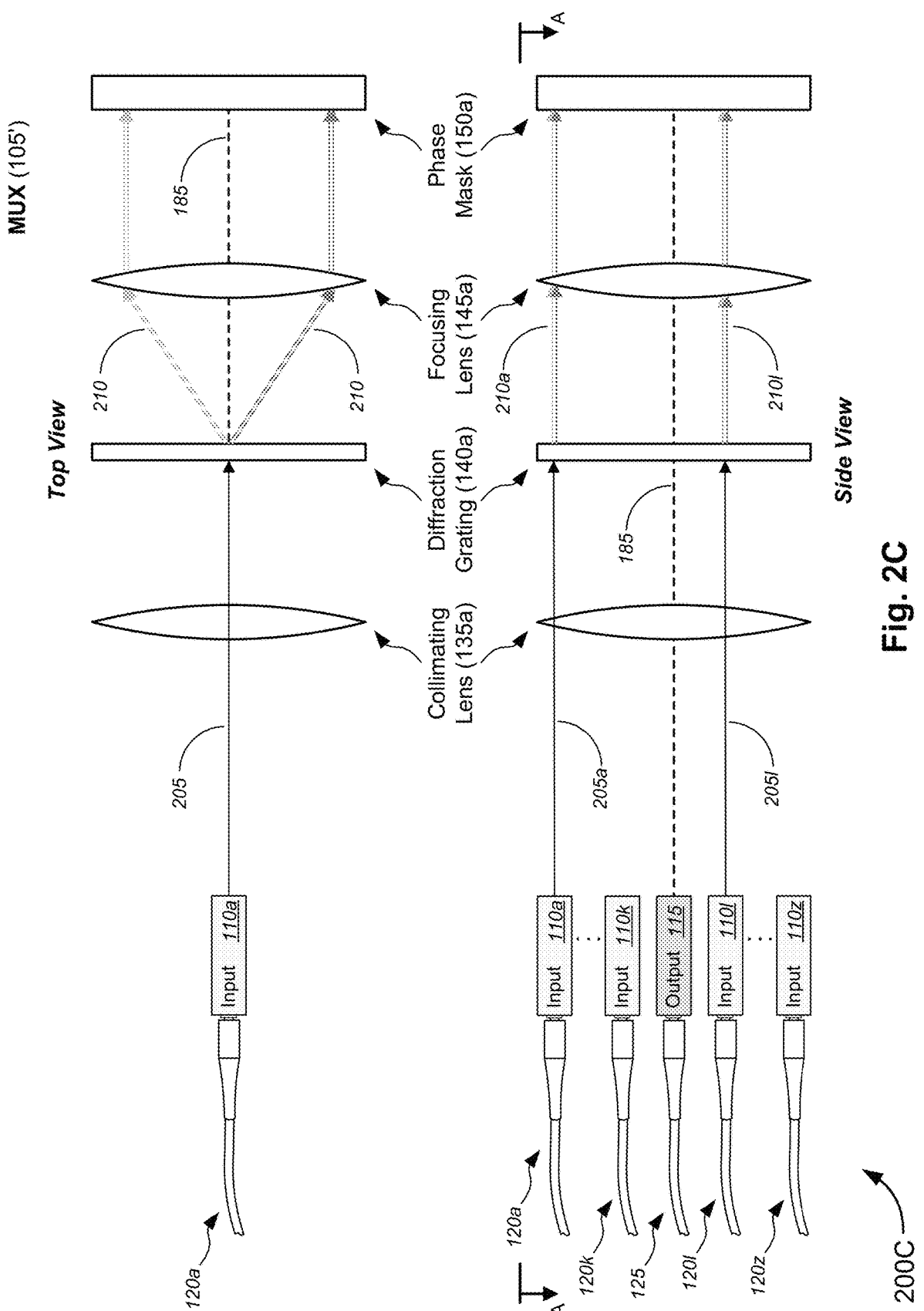
FIGS. 2C and 2D depict another example optical arrangement(s) for another example high-power mux and components for implementing hollow core fiber DWDM applications.
Figure 2D:
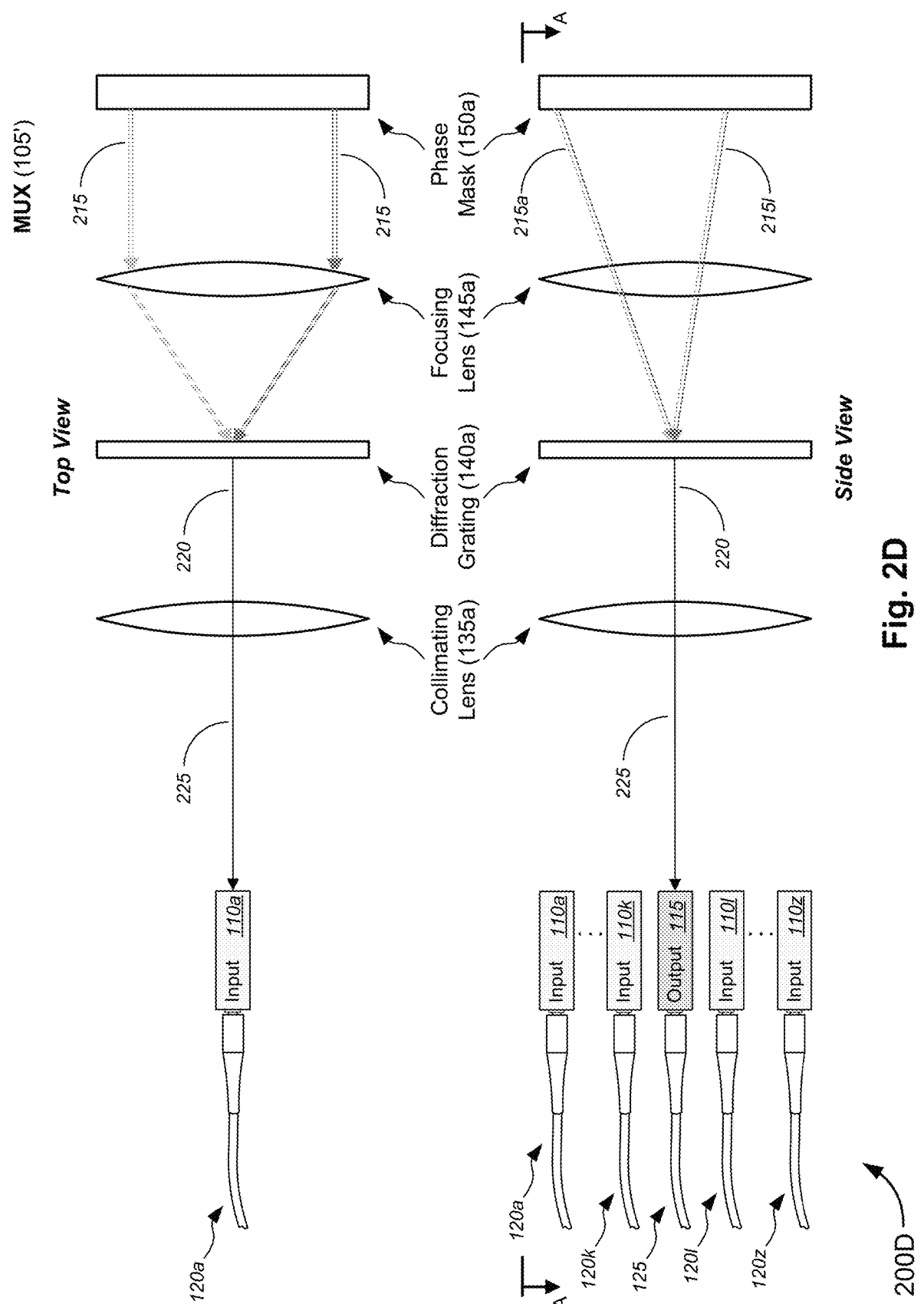

FIGS. 2A-2D depict various example optical arrangements 200A-200D for high-power muxes and components for implementing hollow core fiber DWDM applications. FIGS. 2A and 2B depict example optical arrangement(s) 200A/200B for an example high-power mux 105 and components for implementing hollow core fiber DWDM applications. FIGS. 2C and 2D depict another example optical arrangement(s) 200C/200D for another example high-power mux 105' and components for implementing hollow core fiber DWDM applications. For simplicity of illustration, FIGS. 2A-2D depict example optical arrangements corresponding to a 1D array of hollow core optical fiber interfaces. While not shown, a 2D array of hollow core optical fiber interfaces would have optical arrangements for each corresponding pair of input/output hollow core optical fiber interfaces that are similar to the example optical arrangements as shown and described with respect to FIGS. 2A-2D.

In some embodiments, mux 105/105', fiber interfaces 110a-110z and 115, fiber cables 120a-120z and 125, polarization diversity optic 130a, one or more collimating lenses 135a, diffraction grating 140a, one or more focusing lenses 145a, 3D printed phase mask 150a, and axis 185 of FIGS. 2A-2D may be similar, if not identical, to mux 105, fiber interfaces 110a-110z and 115, fiber cables 120a-120z and 125, polarization diversity optic 130a, one or more collimating lenses 135a, diffraction grating 140a, one or more focusing lenses 145a, 3D printed phase mask 150a, and axis 185, respectively, of example systems 100A and/or 100B of FIG. 1, and the description of these components of example systems 100A and 100B of FIG. 1 are similarly applicable to the corresponding components of FIGS. 2A-2D. In each of FIGS. 2A-2D, the Top View depicts optical signals propagating through components of mux 105 or 105' when viewed along direction arrows A-A shown in the Side View.

In examples, for a mux/demux (e.g., mux 105 or 105') in mux mode, two or more fiber cables of a set of first free-space optical fiber cables (e.g., fiber cables 120a-120z) transmit a plurality of incoming optical signals through corresponding two or more fiber interfaces of a set of hollow core optical fiber interfaces (e.g., fiber interfaces 110a-110z). One or more first lenses among a set of lenses (e.g., collimating lens(es) 135a and focusing lens(es) 145a) and a diffraction grating (e.g., diffraction grating 140a) collimate and focus the plurality of incoming optical signals onto a 3D printed phase mask (e.g., phase mask 150a). The plurality of incoming optical signals propagates along a first plane that is perpendicular to an incident surface of the diffraction grating or an incident surface of the 3D printed phase mask. As shown in FIGS. 2A and 2C, the incident surface of the diffraction grating or the incident surface of the 3D printed phase mask is perpendicular to axis 185. The diffraction grating diffracts each incoming optical signal along a second plane, based on wavelength. In some cases, the second plane is perpendicular to each of the first plane and the incident surface of the diffraction grating. In examples, each of the first plane and the second plane is parallel to axis 185. In some cases, axis 185 extends along the first plane. The 3D printed phase mask reflects the plurality of incoming optical signals at different optical path lengths to provide a reflected plurality of optical signals with different phases. One or more second lenses (e.g., focusing lens(es) 145a) among the set of lenses focus the reflected plurality of optical signals with different phases onto the diffraction grating. The diffraction grating diffracts the reflected plurality of optical signals with different phases, based on the different wavelengths, into a single outgoing optical signal. The single outgoing optical signal is collimated and focused onto the first hollow core optical fiber interface by one or more third lenses (e.g., collimating lens(es) 135a) among the set of lenses for transmission through a second free-space optical fiber cable (e.g., fiber cable 125).

In some examples, such as in FIGS. 2A and 2B, the plurality of incoming optical signals is each separated by a polarization diversity optic (e.g., polarization diversity optic 130a) into different incoming optical signals, based on the different polarizations. In some cases, the different incoming optical signals propagate along the first plane. The different incoming optical signals are subsequently collimated and focused onto the 3D printed phase mask by the set of lenses (e.g., collimating lens(es) 135a and focusing lens(es) 145a) and by the diffraction grating. As the reflected plurality of incoming optical signals with different phases is combined into the single outgoing optical signal, the different incoming optical signals that are reflected by the 3D printed phase mask are combined into the single outgoing optical signal by the polarization diversity optic.

With reference to the non-limiting examples 200A and 200B of FIGS. 2A and 2B, for mux 105, in mux mode, fiber cables 120a and 1201 transmit incoming optical signals 205a and 205l through corresponding hollow core optical fiber interfaces 110a and 110l. Incoming optical signals 205a and 205l each propagates along a first plane that is parallel to axis 185. The polarization diversity optic 130a separates each incoming optical signal 205a and 205l into different incoming optical signals 205a, 205a', 205l, and 205l' based on the different polarizations. In FIGS. 2A and 2B, for simplicity of illustration, two different incoming signals (corresponding to two different polarizations) are shown for each incoming signal (e.g., incoming signals 205a and 205a' for incoming signal 205a and incoming signals 205l and 205l' for incoming signal 205l. However, if the incoming optical signal 205a or 205l has three or more different polarizations, then polarization diversity optic 130a would separate each incoming optical signal (e.g., incoming optical signal 205a or 205l) into three or more different incoming signals (not shown). In some cases, the incoming optical signals 205a, 205a', 205l, and 205l' propagate along the first plane. The incoming optical signals 205a, 205a', 205l, and 205l' propagate through collimating lens 135a, which collimates these optical signals onto diffraction grating 140a. Diffraction grating 140a diffracts each incoming optical signal 205a, 205a', 205l, and 205l' into diffracted incoming optical signals 210a, 210a', 2101, and 210l', based on wavelength. The optical signals 210a, 210a', 2101, and 210l' are diffracted, and propagate, along the second plane that is parallel to axis 185 (and that is, in some cases, perpendicular to the first plane). The diffracted incoming optical signals 210a, 210a', 2101, and 210l' are focused, by focusing lens 145a, onto the incident surface of 3D printed phase mask 150a.

Referring to FIG. 2B, the phase mask 150a reflects the optical signals 210a, 210a', 2101, and 210l' as reflected optical signals 215a, 215a', 215l, and 215l'. In an example, reflected optical signals 215a, 215a', 215l, and 215l' are reflected from the phase mask 150a, such that optical signals 215l and 215l' each has a different phase compared with optical signals 215a and 215a', respectively. In another example, reflected optical signals 215a, 215a', 215l, and 215l' are reflected from the phase mask 150a, such that optical signals 215a' and 215l' each has a different phase compared with optical signals 215a and 215l, respectively. In yet another example, reflected optical signals 215a, 215a', 215l, and 215l' are reflected from the phase mask 150a, such that each of optical signals 215a, 215a', 215l, and 215l' has a different phase compared with each of two or more other optical signals among optical signals 215a, 215a', 215l, and 215l'. The reflected optical signals 215a, 215a', 215l, and 215l' are focused, by focusing lens 145a, onto the diffraction grating 140a, which diffracts the reflected and focused optical signals 215a, 215a', 215l, and 215l' into outgoing optical signals 220 and 220' having different polarizations. In some cases, diffraction grating 140a combines optical signals 215a and 215l into outgoing optical signal 220, while combining optical signals 215a' and 215l' into outgoing optical signal 220'. The outgoing optical signals 220 and 220' are collimated by collimating lens 135a onto polarization diversity optic 130a, which combines the outgoing optical signals 220 and 220' into a single outgoing optical signal 225. The single outgoing optical signal 225 is focused into fiber interface 115 for transmission through fiber cable 125.

Referring to FIGS. 2C and 2D, mux 105' is similar, if not identical, to mux 105, except that mux 105' does not include polarization diversity optic 130a, respectively, of mux 105. Incoming optical signals 205a and 205l each propagates along the first plane that is parallel to axis 185. The incoming optical signals 205a and 205l propagate through collimating lens 135a, which collimates these optical signals onto diffraction grating 140a. Diffraction grating 140a diffracts each incoming optical signal 205a and 205l into diffracted incoming optical signals 210a and 2101, based on wavelength, the diffracted incoming optical signals 210a and 2101 propagating along the second plane that is parallel to axis 185. The diffracted incoming optical signals 210a and 2101 are focused, by focusing lens 145a, onto the incident surface of 3D printed phase mask 150a. Referring to FIG. 2D, the phase mask 150a reflects the optical signals 210a and 2101 as reflected optical signals 215a and 215l. The reflected optical signals 215a and 215l are focused, by focusing lens 145a, onto the diffraction grating 140a, which diffracts the reflected and focused optical signals 215a and 215l into a single outgoing optical signal 220. The single outgoing optical signal 220 is collimated, by collimating lens 135a, into a single outgoing optical signal 225, which is focused into fiber interface 115 for transmission through fiber cable 125.

Figure 3A:
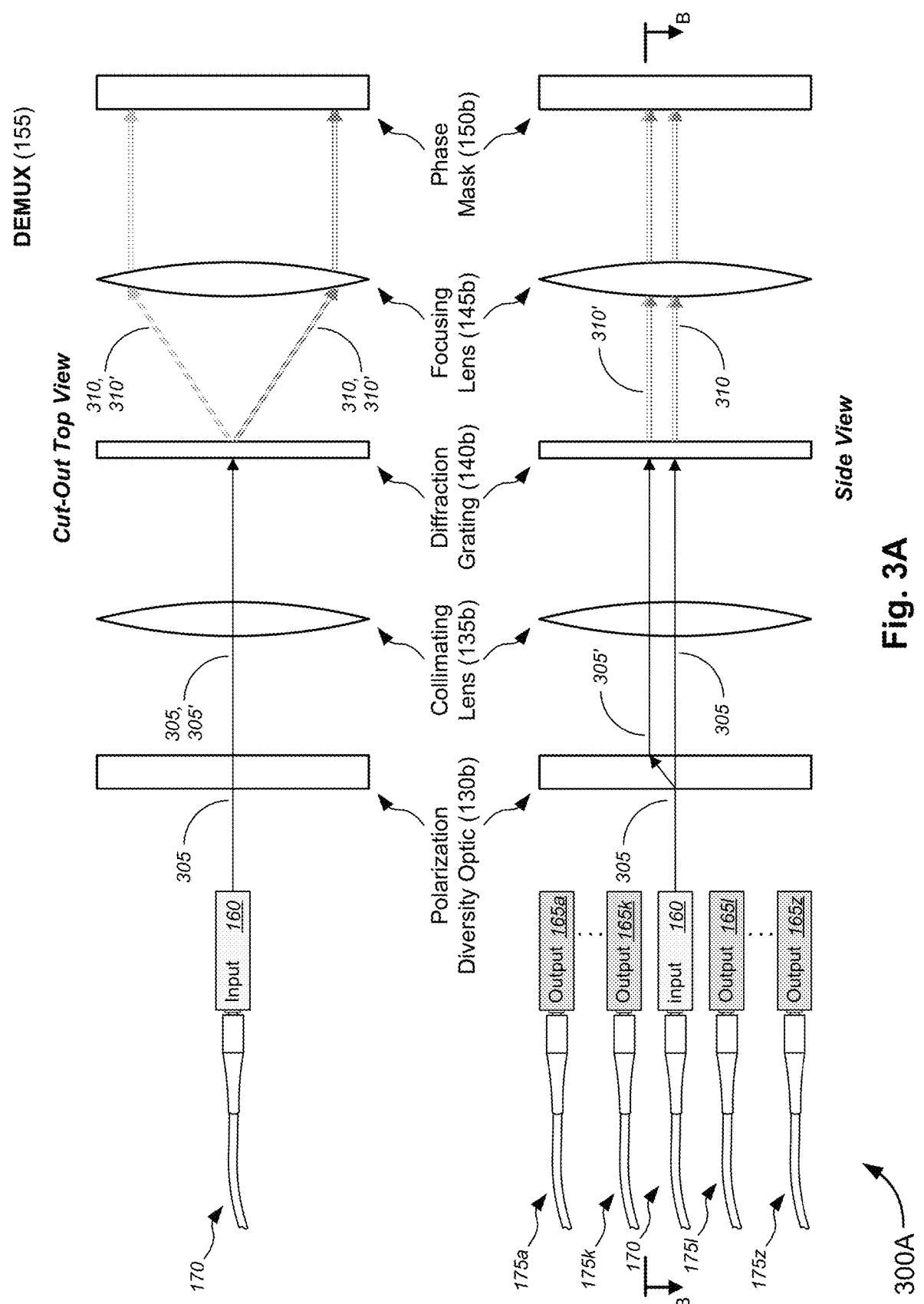
FIGS. 3A and 3B depict example optical arrangement(s) for an example high-power demux and components for implementing hollow core fiber DWDM applications.
Figure 3B:
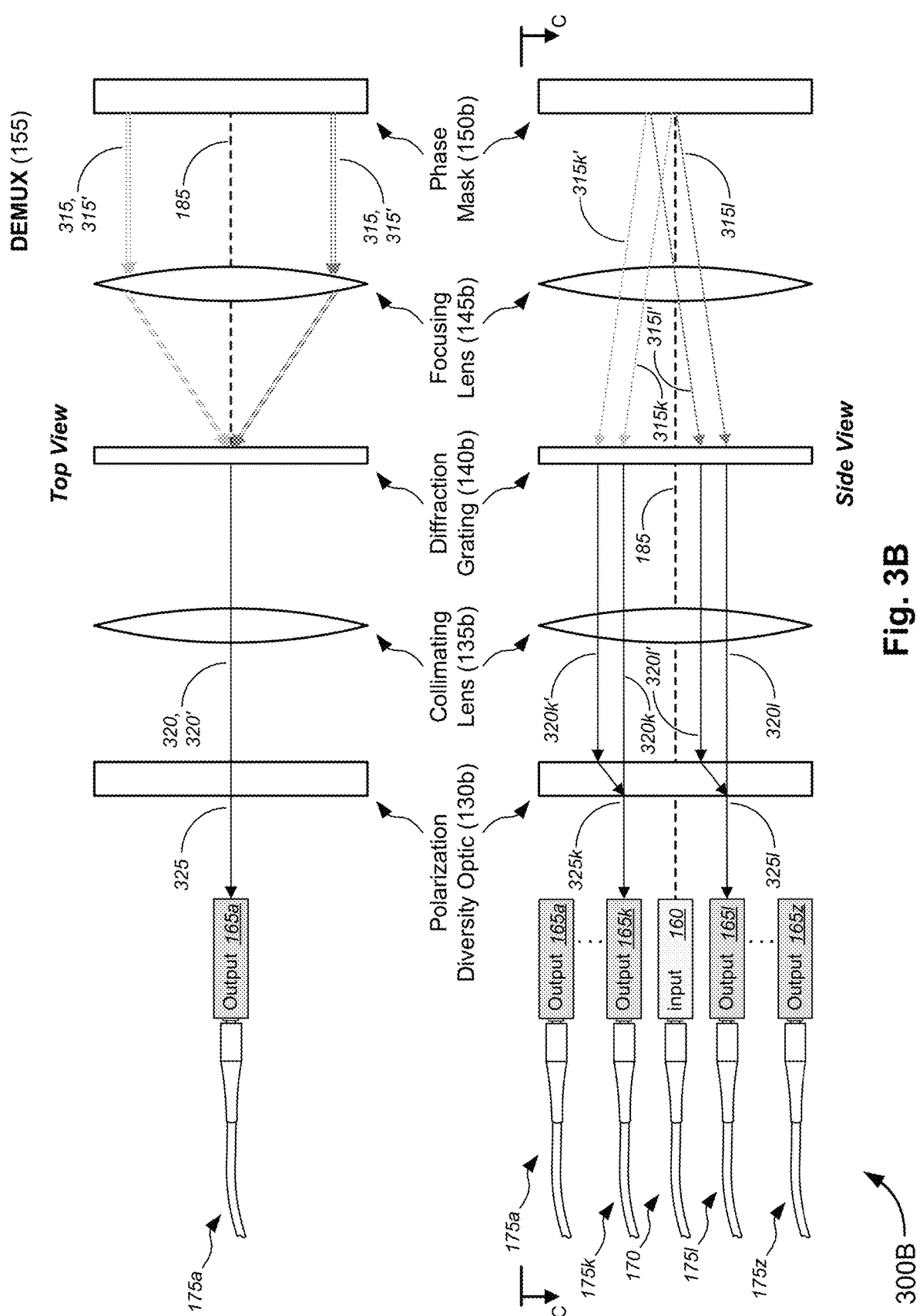
Figure 3C:
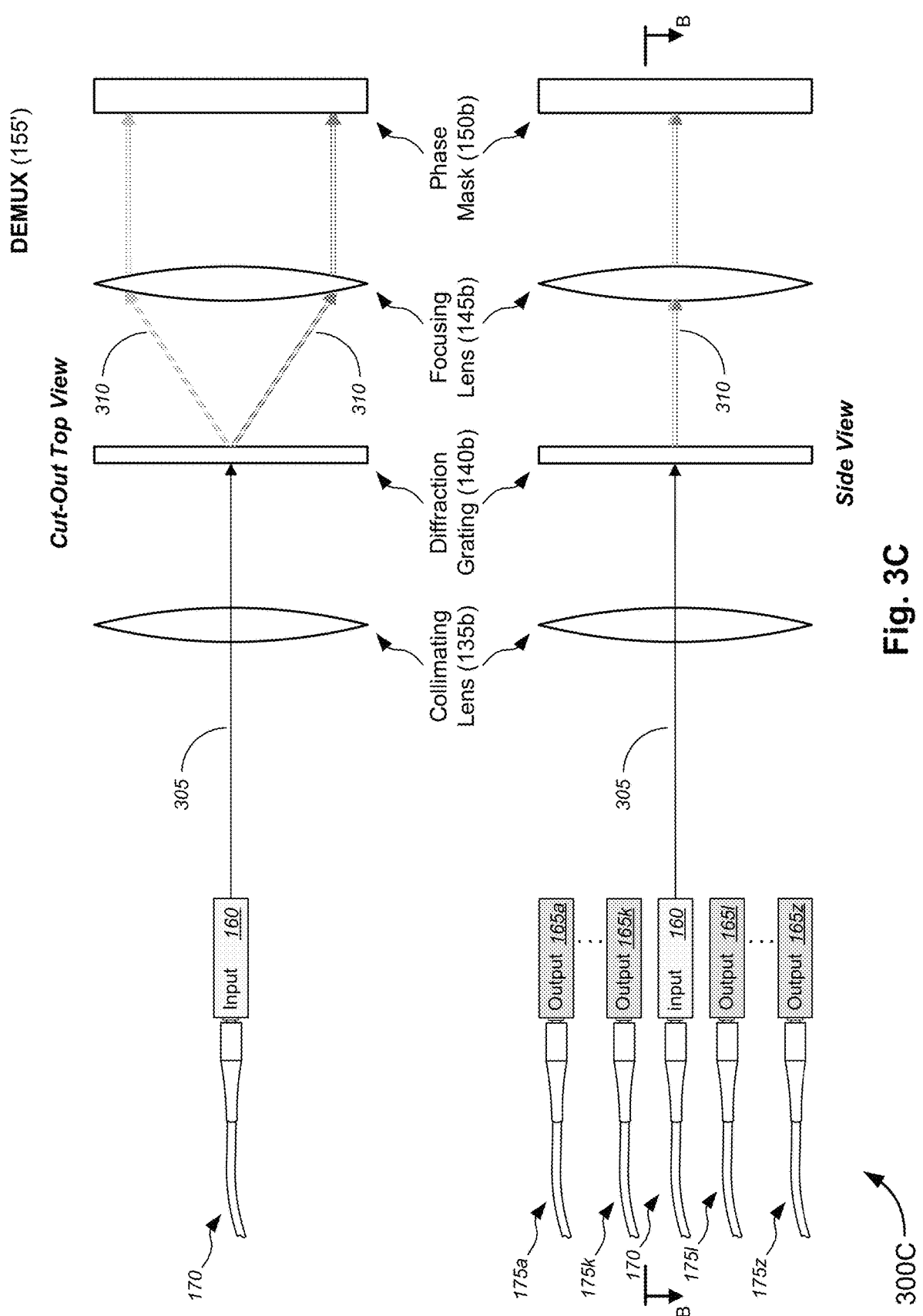
FIGS. 3C and 3D depict another example optical arrangement(s) for another example high-power demux and components for implementing hollow core fiber DWDM applications.
Figure 3D:
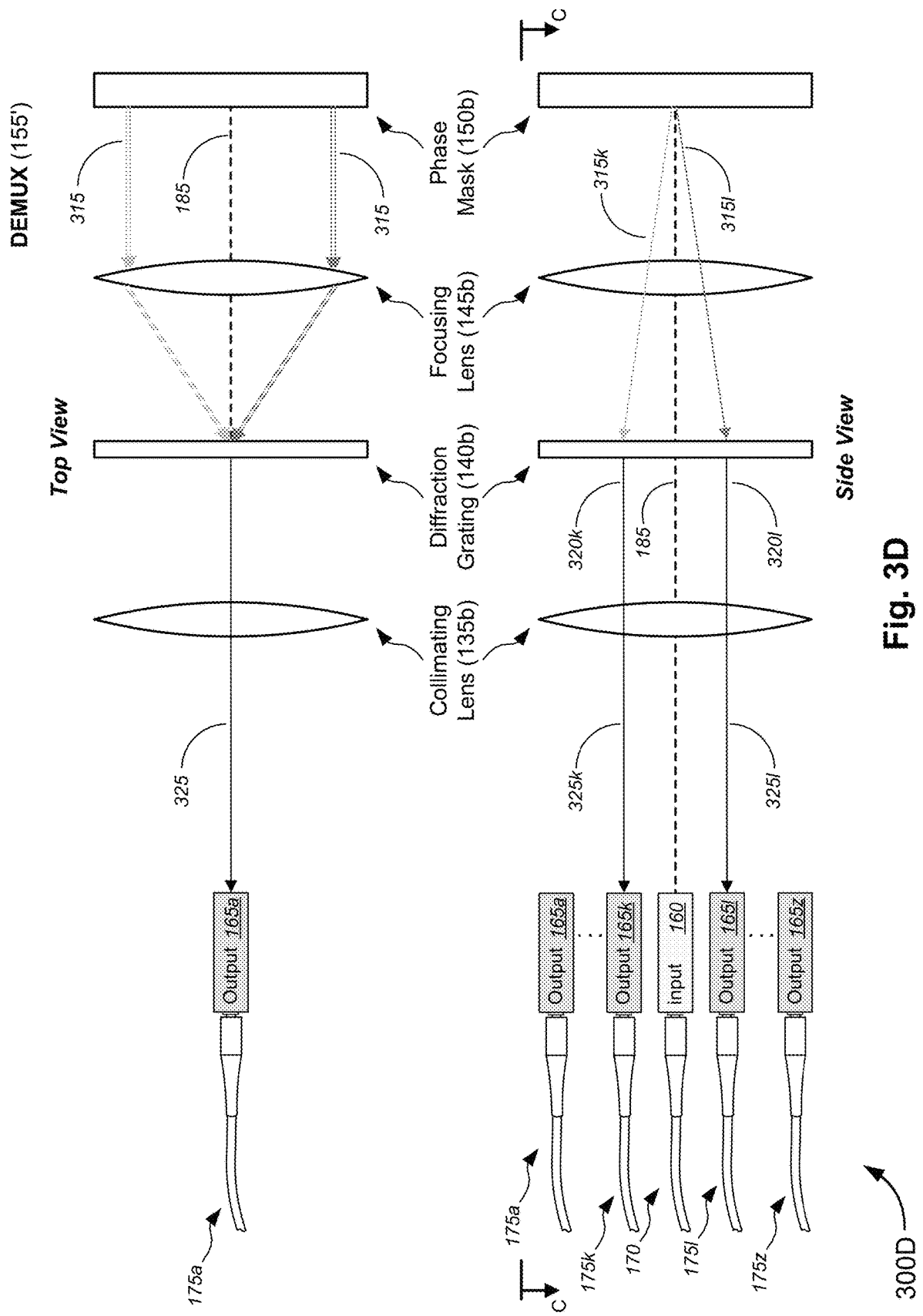

FIGS. 3A-3D depict various example optical arrangements 300A-300D for high-power demuxes and components for implementing hollow core fiber DWDM applications. FIGS. 3A and 3B depict example optical arrangement(s) 300A/300B for an example high-power demux 155 and components for implementing hollow core fiber DWDM applications. FIGS. 3C and 3D depict another example optical arrangement(s) 300C/300D for another example high-power demux 155' and components for implementing hollow core fiber DWDM applications. For simplicity of illustration, FIGS. 3A-3D depict example optical arrangements corresponding to a 1D array of hollow core optical fiber interfaces. While not shown, a 2D array of hollow core optical fiber interfaces would have optical arrangements for each corresponding pair of input/output hollow core optical fiber interfaces that are similar to the example optical arrangements as shown and described with respect to FIGS. 3A-3D.

In some embodiments, demux 155/155', fiber interfaces 160 and 165a-165z, fiber cables 170 and 175a-175z, polarization diversity optic 130b, one or more collimating lenses 135b, diffraction grating 140b, one or more focusing lenses 145b, 3D printed phase mask 150b, and axis 185 of FIGS. 3A-3D may be similar, if not identical, to demux 155, fiber interfaces 160 and 165a-165z, fiber cables 170 and 175a-175z, polarization diversity optic 130b, one or more collimating lenses 135b, diffraction grating 140b, one or more focusing lenses 145b, 3D printed phase mask 150b, and axis 185, respectively, of example systems 100A and/or 100B of FIG. 1, and the description of these components of example systems 100A and 100B of FIG. 1 are similarly applicable to the corresponding components of FIGS. 3A-3D. In each of FIGS. 3A and 3C, the Cut-Out Top View depicts optical signals propagating through components of demux 155 or 155' when viewed along direction arrows B-B in the Side View, while in each of FIGS. 3B and 3D, the Top View depicts optical signals propagating through components of demux 155 or 155' when viewed along direction arrows C-C in the Side View.

In examples, for a mux/demux (e.g., demux 155 or 155') in demux mode, a first free-space optical fiber cable (e.g., fiber cable 170) transmits a single incoming optical signal through a first hollow core optical fiber interface (e.g., fiber interface 160). One or more first lenses among a set of lenses (e.g., collimating lens(es) 135b) collimates the single incoming signal onto a diffraction grating (e.g., diffraction grating 140b). The incoming optical signal propagates along a first plane that is perpendicular to an incident surface of the diffraction grating or an incident surface of a 3D printed phase mask (e.g., 3D printed phase mask 150b). As shown in FIGS. 3B and 3D, the incident surface of the diffraction grating or an incident surface of the 3D printed phase mask is perpendicular to axis 185. The diffraction grating diffracts the single incoming optical signal into a plurality of optical signals along a second plane, based on wavelength. In some cases, the second plane is perpendicular to each of the first plane and the incident surface of the diffraction grating. In examples, each of the first plane and the second plane is parallel to axis 185. In some cases, axis 185 extends along the first plane. One or more second lenses (e.g., focusing lens(es) 145b) among the set of lenses focus the plurality of optical signals onto the 3D printed phase mask. The 3D printed phase mask reflects the plurality of optical signals at different optical path lengths to provide a reflected plurality of optical signals with different phases. The one or more second lenses (e.g., focusing lens(es) 145b) focus the reflected plurality of optical signals with different phases onto the diffraction grating. The diffraction grating diffracts the reflected plurality of optical signals into two or more outgoing optical signals that are collimated and focused, by the one or more first lenses (e.g., collimating lens(es) 135b) onto two or more of a set of second hollow core optical fiber interfaces (e.g., fiber interfaces 165a-165z) based on wavelength and phase for transmission through corresponding two or more of the set of second free-space optical fiber cables (e.g., fiber cables 175a-175z).

In some examples, such as in FIGS. 3A and 3B, the single incoming optical signal is separated by a polarization diversity optic (e.g., polarization diversity optic 130b) into the different incoming optical signals, based on the different polarizations. In some cases, the different incoming optical signals propagate along the first plane. The different incoming optical signals are subsequently collimated, by the one or more first lenses (e.g., collimating lens 135*b*), onto the diffraction grating that diffracts each different incoming optical signal into the plurality of optical signals, based on wavelength, along the second plane. The plurality of optical signals is focused onto the 3D printed phase mask by the one or more focusing lenses. After being reflected by the 3D printed phase mask and after being focused, diffracted, and collimated by the one or more second lenses, the diffraction grating, and the one or more first lenses, respectively, each set of two or more of the different optical signals having similar phase are combined or merged together into the two or more outgoing optical signals by the polarization diversity optic, prior to being focused onto a corresponding one of the two or more of the set of second hollow core optical fiber interfaces.

With reference to the non-limiting examples 300A and 300B of FIGS. 3A and 3B, for demux 155, in demux mode, fiber cable 170 transmits incoming optical signal 305 through hollow core optical fiber interface 160. Incoming optical signal 305 is separated into different incoming optical signals 305 and 305', based on the different polarizations. In FIGS. 3A and 3B, two different incoming signals 305 and 305' (corresponding to two different polarizations) are shown for simplicity of illustration. However, if the incoming optical signal 305 has three or more different polarizations, then polarization diversity optic 130*b* would separate the incoming optical signal 305 into three or more different incoming signals (not shown). In some cases, the incoming optical signals 305 and 305' propagate along the first plane that is parallel to axis 185. The incoming optical signals 305 and 305' propagate through collimating lens 135*b*, which collimates these optical signals onto diffraction grating 140*b*. Diffraction grating 140*b* diffracts each incoming optical signal 305*a* and 305' into diffracted incoming optical signals 310 and 310', based on wavelength. The optical signals 310 and 310' are diffracted, and propagate, along the second plane that is parallel to axis 185 (and that is, in some cases, perpendicular to the first plane). The diffracted incoming optical signals 310 and 310' are focused, by focusing lens 145*b*, onto the incident surface of 3D printed phase mask 150*b*.

Referring to FIG. 3B, the phase mask 150*b* reflects the optical signals 310 and 310' as reflected optical signals 315*k*, 315*k'*, 315*l*, and 315*l'*. In an example, reflected optical signals 315*k*, 315*k'*, 315*l*, and 315*l'* are reflected from the phase mask 150*b*, such that optical signals 315*l* and 315*l'* each has a different phase compared with optical signals 315*k* and 315*k'*, respectively. In another example, reflected optical signals 315*k*, 315*k'*, 315*l*, and 315*l'* are reflected from the phase mask 150*b*, such that optical signals 315*k'* and 315*l'* each has a different phase compared with optical signals 315*k* and 315*l*, respectively. In yet another example, reflected optical signals 315*k*, 315*k'*, 315*l*, and 315*l'* are reflected from the phase mask 150*b*, such that each of optical signals 315*k*, 315*k'*, 315*l*, and 315*l'* has a different phase compared with each of two or more other optical signals among optical signals 315*k*, 315*k'*, 315*l*, and 315*l'*. The reflected optical signals 315*k*, 315*k'*, 315*l*, and 315*l'* are focused, by focusing lens 145*b*, onto the diffraction grating 140*b*, which diffracts the reflected and focused optical signals 315*k*, 315*k'*, 315*l*, and 315*l'* into outgoing optical signals 320*k*, 320*k'*, 320*l*, and 320*l'* having different polarizations. The outgoing optical signals 320*k*, 320*k'*, 320*l*, and 320*l'* are collimated by collimating lens 135*b* onto polarization diversity optic 130*b*. The polarization diversity optic 130*b* combines or merges together each set of two or more of the outgoing optical signals 320*k*, 320*k'*, 320*l*, and 320*l'* having similar phase into two or more outgoing optical signals 325*k* and 325*l* (e.g., optical signals 320*k* and 320*k'* combined or merged together into outgoing optical signal 325*k* and optical signals 320*l* and 320*l'* combined or merged together into outgoing optical signal 325*l*). The two or more outgoing optical signal 325*k* and 325*l* are focused into corresponding two or more fiber interfaces 165*k* and 165 for transmission through corresponding two or more fiber cables 175*k* and 175*l*.

Referring to FIGS. 3C and 3D, demux 155' is similar, if not identical, to demux 155, except that demux 155' does not include polarization diversity optic 130*b*, respectively, of demux 155. Incoming optical signal 305 propagates along the first plane that is parallel to axis 185, through collimating lens 135*b*, which collimates the incoming optical signal 305 onto diffraction grating 140*b*. Diffraction grating 140*b* diffracts the incoming optical signal 305 into diffracted incoming optical signals 310, based on wavelength, the diffracted incoming optical signals 310 propagating along the second plane that is parallel to axis 185. The diffracted incoming optical signals 310 are focused, by focusing lens 145*b*, onto the incident surface of 3D printed phase mask 150*b*. Referring to FIG. 3D, the phase mask 150*b* reflects the optical signals 310 as reflected optical signals 315*k* and 315*l*. The reflected optical signals 315*k* and 315*l* are focused, by focusing lens 145*b*, onto the diffraction grating 140*b*, which diffracts the reflected and focused optical signals 315*k* and 315*l* into outgoing optical signals 320*k* and 320*l*. The outgoing optical signals 320*k* and 320*l* are collimated, by collimating lens 135*b*, as two or more outgoing optical signals 325*k* and 325*l*, which are focused into corresponding two or more fiber interfaces 165*k* and 165 for transmission through corresponding two or more fiber cables 175*k* and 175*l*.

Figures 4D, 4E, 4F:
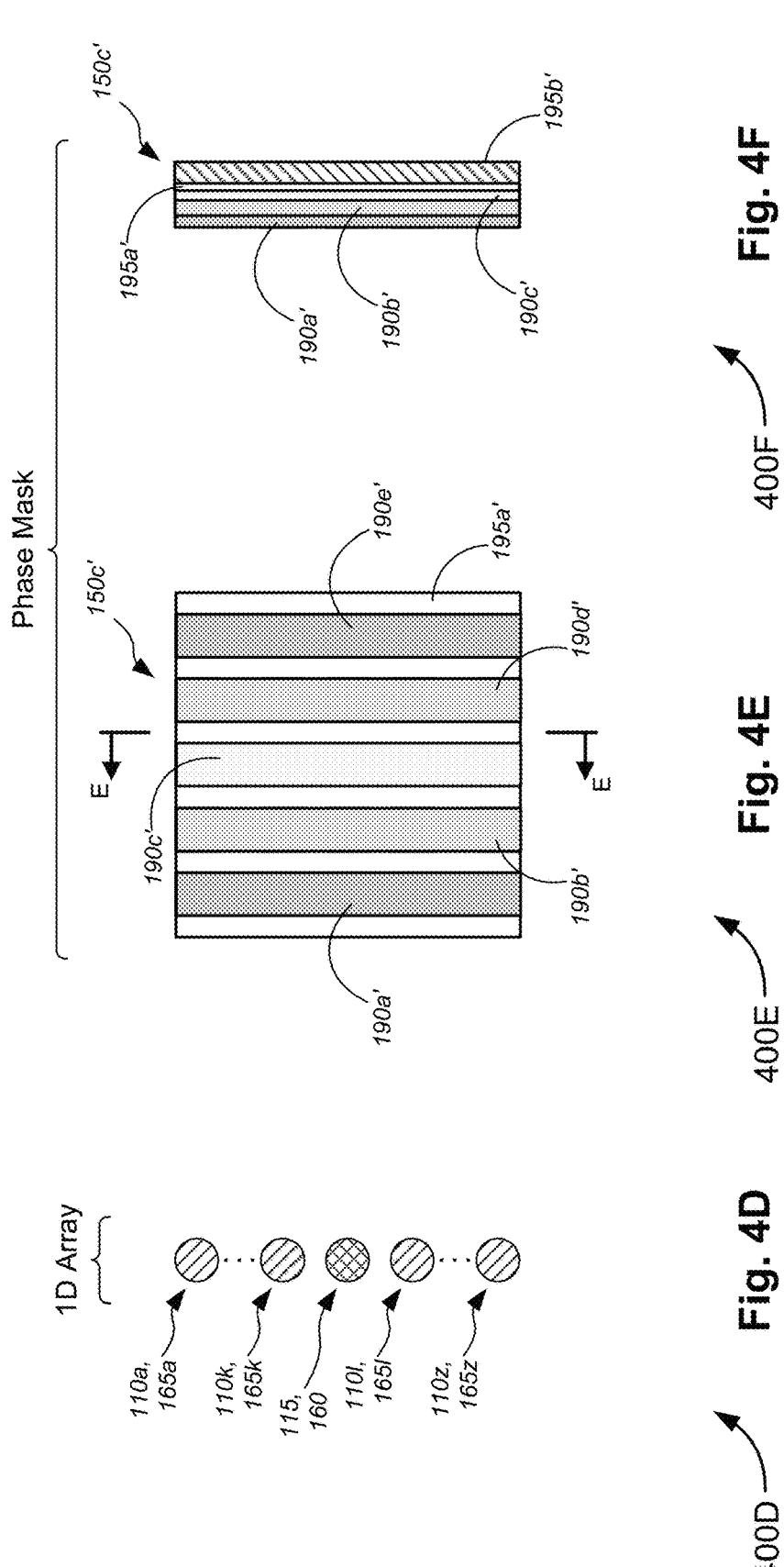
Figures 4G, 4H, 4I:
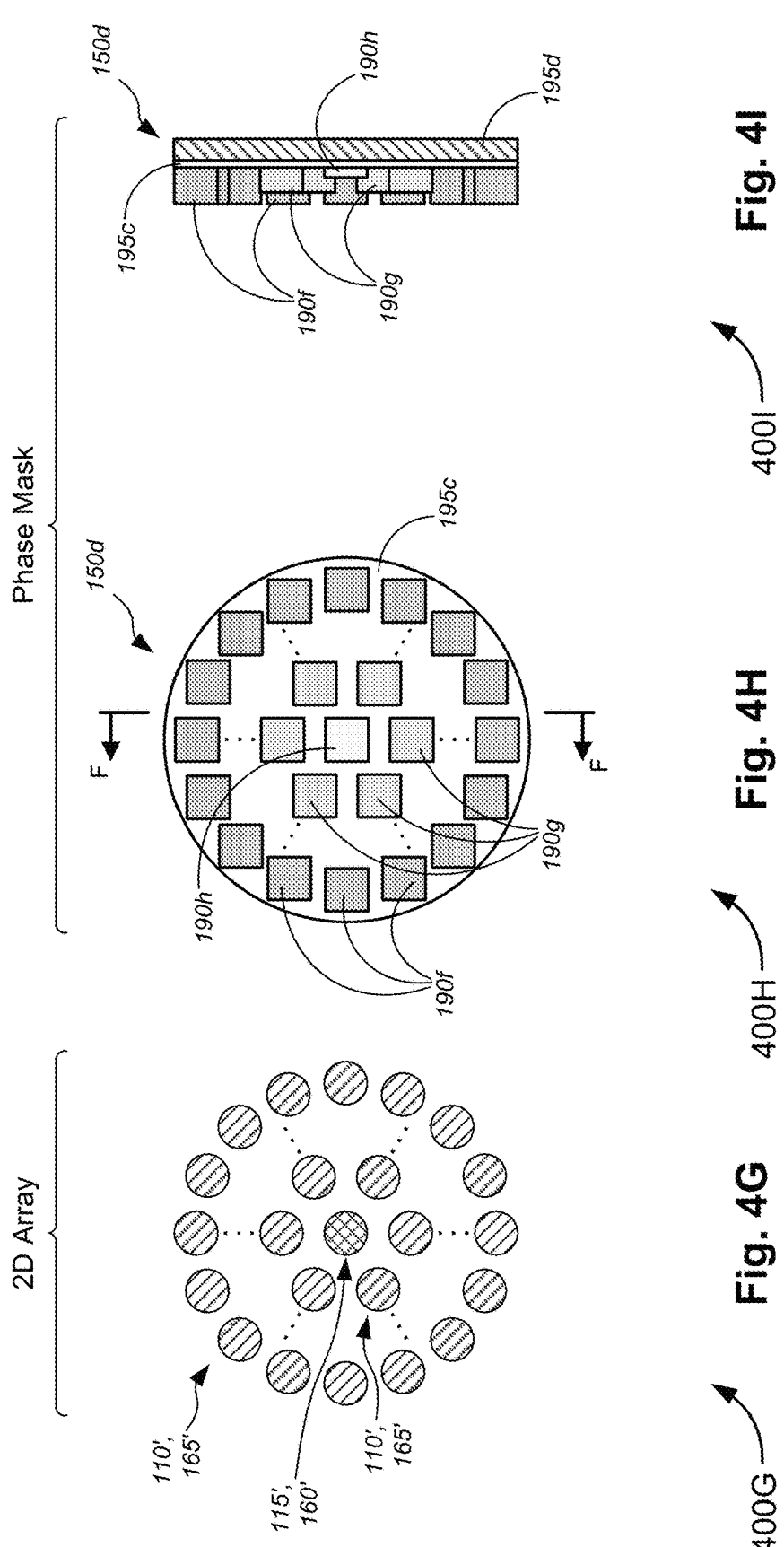
FIGS. 4G-4L depict sets of an example 2D array of hollow core optical fiber interfaces and a corresponding example 3D printed phase mask for a mux/demux.
Figures 4J, 4K, 4L:
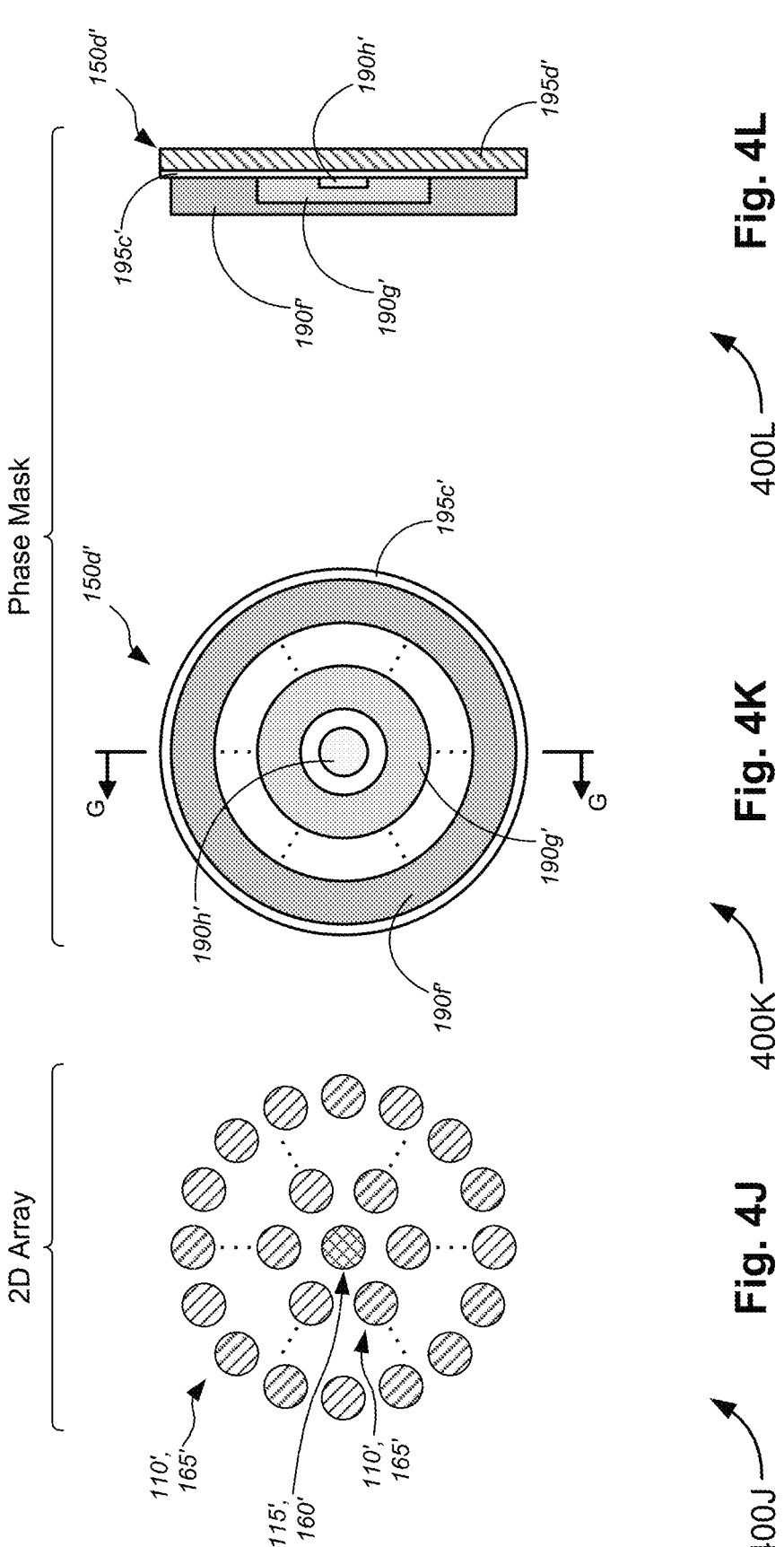

FIGS. 4A-4L depict various sets of example arrays 400A/400D and 400G/400J of hollow core optical fiber interfaces and corresponding examples 400B/400C/400E/400F and 400H/400I/400K/400L of 3D printed phase mask for a mux/demux. FIGS. 4A-4C depict a set of an example 1D array 400A of hollow core optical fiber interfaces and a corresponding example(s) 400B/400C of 3D printed phase mask for a mux/demux. FIGS. 4D-4F depict a set of an example 1D array 400D of hollow core optical fiber interfaces and a corresponding example(s) 400E/400F of 3D printed phase mask for a mux/demux. FIGS. 4G-4I depict a set of an example 2D array 400G of hollow core optical fiber interfaces and a corresponding example(s) 400H/400I of 3D printed phase mask for a mux/demux. FIGS. 4J-4L depict a set of an example 2D array 400J of hollow core optical fiber interfaces and a corresponding example(s) 400K/400L of 3D printed phase mask for a mux/demux. In some embodiments, fiber interfaces 110*a*-110*z*, 110', 115, 115', 160, 160', 165*a*-165*z*, and 165', and 3D printed phase mask 150*c*, 150*c'*, 150*d*, and 150*d'* of FIGS. 4A-4L may be similar, if not identical, to fiber interfaces 110*a*-110*z*, 115, 160, and 165*a*-165*z*, and 3D printed phase mask 150*a* and 150*b*, respectively, of example systems 100A and 100B of FIG. 1, and the description of these components of example systems 100A and 100B of FIG. 1 are similarly applicable to the corresponding components of FIGS. 4A-4L.

As shown in FIGS. 4A and 4D, hollow core optical fiber interfaces 110*a*-110*z*, 115, 160, and 165*a*-165*z* are arranged in a 1D array 400A/400D, with hollow core optical fiber interface 115 or 160 being positioned in a middle or central portion of the 1D array 400A and surrounded on each side by one or more hollow core optical fiber interfaces 110*a*-

110*k*/165*a*-165*k* or 110*l*-110*z*/165-165*z*. Herein, k, l, and z are non-negative integer numbers, where k<l<z. Referring to FIGS. 4B, 4C, 4E, and 4F, phase mask 150*c* or 150*c'* includes a plurality of reflective features 190*a*-190*e* or 190*a'*-190*e'*, incident surface 195*a* or 195*a'*, and base or substrate 195*b* or 195*b'*. Each reflective feature 190 or 190' among the plurality of reflective features 190*a*-190*e* or 190*a'*-190*e'* is configured to reflect a plurality of optical signals having different wavelengths at different optical path lengths to provide a reflected corresponding plurality of optical signals with different phases. The incident surface 195*a* or 195*a'* is perpendicular to axis 185 (as shown in FIGS. 1A-3D) when phase mask 150*c* or 150*c'* is assembled, e.g., within mux 105 or demux 155 of FIGS. 1A-3D. The plurality of reflective features 190*a*-190*e* or 190*a'*-190*e'* extends from, or is disposed (in some cases, 3D printed) on, incident surface 195*a* or 195*a'*. The incident surface 195*a* or 195*a'* either extends from, is disposed (in some cases, 3D printed) on, or is part of base or substrate 195*b* or 195*b'*. In examples, the plurality of reflective features 190*a*-190*e* or 190*a'*-190*e'* (and, in some cases as well, the incident surface 195*a* or 195*a'* and/or the base or substrate 195*b* or 195*b'*) is made from a material that has low loss and high reflectance, such as materials including fused silica, fused quartz, silicon dioxide, or metallic material (e.g., aluminum). In some examples, the metallic material has low loss and high reflectance for particular wavelengths (e.g., 1550 nm) or ranges of wavelengths (e.g., 200-2500 nm). As used herein, reflectance refers to a measure of a material's ability to reflect light, and is a ratio of an amount of light reflected from a surface to an amount of light incident on said surface. Reflectance, although related, is different from reflectivity, which is a material's inherent property to reflect light without any regard to an amount of light that is incident on it. As used herein, "high reflectance" refers to reflectance values above 75%, ideally, above 90%.

FIG. 4B depicts a view of example phase mask 150*c* when viewed along axis 185 from hollow core optical fiber interfaces 110*a*-110*z*, 115, 160, and 165*a*-165*z* when phase mask 150*c* is assembled, e.g., within mux 105 or demux 155 of FIGS. 1A-3D. FIG. 4C depicts a view of example phase mask 150*c* when viewed along direction arrows D-D in FIG. 4B. In the non-limiting example of FIGS. 4B and 4C, the plurality of reflective features 190*a*-190*e* are depicted as rectangular or square shaped structures, although other shapes may be used, including circular, triangular, pentagonal, hexagonal, heptagonal, octagonal, or other polygonal shape. The positions (or relative positions) and arrangements of the reflective features 190*a*-190*e* may be determined based on designed spacing between the diffraction grating (e.g., diffraction grating 140*a* or 140*b* of FIGS. 1A-3D) and the phase mask 150*c* (or particular reflective features 190*a*-190*e* extending from incident surface 195*a* thereof) and based on diffraction of particular wavelengths by the diffraction grating. 3D printing of the reflective features on the phase mask 150*c* (or 3D printing the phase mask 150*c* itself) enables rapid prototyping and iterative adjustment to optimize positions, arrangements, distance (or thickness) relative to incident surface 195*a*, and/or surface orientation, contour, and/or configuration (such as shown and described below with respect to FIGS. 5A-5F) of the reflective features, to achieve desired phase shifting objectives for the mux/demux. For other optical applications, 3D printing of the reflective features on the phase mask 150*c* (or 3D printing the phase mask 150*c* itself) allows for optimizing desired phase mask characteristics. In an example, as shown in FIG. 4C, reflective features 190*a* (as well as 190*e*, not shown in FIG. 4C) may each have a distance (or thickness) from the incident surface 195*a* that is greater than that of reflective features 190*b* (as well as 190*d*, not shown in FIG. 4C), which in turn may each have a distance (or thickness) from the incident surface 195*a* that is greater than that of reflective features 190*c*. In another example, not shown, reflective features 190*a*-190*e* may have the same distance (or thickness) relative to the incident surface 195*a*. Although shown in FIG. 4C as having a flat surface, reflective features 190*a*-190*e* may have any suitable surface orientation, contour, and/or configuration, such as shown, e.g., in FIGS. 5A-5F.

FIG. 4E depicts a view of example phase mask 150*c'* when viewed along axis 185 from hollow core optical fiber interfaces 110*a*-110*z*, 115, 160, and 165*a*-165*z* when phase mask 150*c'* is assembled, e.g., within mux 105 or demux 155 of FIGS. 1A-3D. FIG. 4F depicts a view of example phase mask 150*c'* when viewed along direction arrows E-E in FIG. 4E. Where FIGS. 4B and 4C depict a series of smaller polygonal shapes arranged (or 3D printed) throughout the incident surface 195*a*, FIGS. 4E and 4F are directed to and depict a series of larger polygonal shapes, in this case, a series of ("vertical") rectangular strips arranged (or 3D printed) to reflect particular wavelengths of optical signals whose optical paths are directed to (or diffracted along the "horizontal" direction) corresponding rectangular strip by the diffraction grating. While the "smaller" reflective features described herein may be designed to reflect one optical signal that is diffract by the diffraction grating, the "larger" reflective features may be designed to reflect two or more optical signals having either different polarizations and/or different wavelengths that have been diffracted by the diffraction grating. In this manner, for muxes/demuxes utilizing polarization diversity optics 130*a* or 130*b*, optical signals having polarizations that may be shifted "vertically" may be reflected without having to specifically determine which portion of the phase mask to position (or 3D print) smaller reflective features to reflect such diffracted polarization-shifted optical signals. In an example, the relative orientations of the 1D array 400A/400D and the phase mask 150*c*/150*c'* are aligned as shown in FIGS. 4A-4F. In another example, the relative orientations of the 1D array 400A/400D and the phase mask 150*c*/150*c'* are rotated 90° about axis 185 (e.g., with one of the 1D array 400A/400D and the phase mask 150*c*/150*c'* as shown in FIGS. 4A-4F being rotated 90° relative to the other of the 1D array 400A/400D and the phase mask 150*c*/150*c'*; not shown).

Although each polygonal strip corresponding to one of the reflective features 190*a'*-190*e'* is shown to be rectangular and also shown to extend from one edge of the phase mask to an opposite edge, each reflective feature 190*a'*-190*e'* may have any suitable polygonal shape and may be positioned (or 3D printed) at any suitable location on the incident surface 195*a'* without extending to an edge and/or without extending more than 50% of a side dimension (e.g., length or width) of the phase mask 150*c'*. Reflective features 190*a'*-190*e'*, incident surface 195*a'*, base or substrate 195*b'*, and/or phase mask 150*c'* are otherwise similar, or identical, to corresponding reflective features 190*a*-190*e*, incident surface 195*a*, base or substrate 195*b*, and/or phase mask 150*c*.

As shown in FIGS. 4G and 4J, hollow core optical fiber interfaces 110', 115', 160', and 165' are arranged in a 2D array 400G/400J, with hollow core optical fiber interface 115' or 160' being positioned in a middle or central portion of the 2D array 400G/400J and surrounded (e.g., on each side) by one or more hollow core optical fiber interfaces 110' and 165'. Referring to FIGS. 4H, 4I, 4K, and 4L, phase mask 150*d* or 150*d'* includes a plurality of reflective features 190*a*-190*c* or 190*a'*-190*c'*, incident surface 195*c* or 195*c'*, and base or substrate 195*d* or 195*d'*. Each reflective feature 190 or 190' among the plurality of reflective features 190*a*-190*c* or 190*a'*-190*c'* is configured to reflect a plurality of optical signals having different wavelengths at different optical path lengths to provide a reflected corresponding plurality of optical signals with different phases. The incident surface 195*c* or 195*c'* is perpendicular to axis 185 (as shown in FIGS. 1A-3D) when phase mask 150*d* or 150*d'* is assembled, e.g., within mux 105 or demux 155 of FIGS. 1A-3D. The plurality of reflective features 190*a*-190*c* or 190*a'*-190*c'* extends from, or is disposed (in some cases, 3D printed) on, incident surface 195*c* or 195*c'*. The incident surface 195*c* or 195*c'* either extends from, is disposed (in some cases, 3D printed) on, or is part of base or substrate 195*d* or 195*d'*.

FIG. 4H depicts a view of example phase mask 150*d* when viewed along axis 185 from hollow core optical fiber interfaces 110', 115', 160', and 165' when phase mask 150*d* is assembled, e.g., within mux 105 or demux 155 of FIGS. 1A-3D. FIG. 4I depicts a view of example phase mask 150*d* when viewed along direction arrows F-F in FIG. 4H. In the non-limiting example of FIGS. 4H and 4I, the plurality of reflective features 190*f*-190*h* are depicted as rectangular or square shaped structures, although other shapes may be used, including circular, triangular, pentagonal, hexagonal, heptagonal, octagonal, or other polygonal shape. The positions (or relative positions) and arrangements of the reflective features 190*f*-190*h* may be determined based on designed spacing between the diffraction grating (e.g., diffraction grating 140*a* or 140*b* of FIGS. 1A-3D) and the phase mask 150*d* (or particular reflective features 190*f*-190*h* extending from incident surface 195*c* thereof) and based on diffraction of particular wavelengths by the diffraction grating.

FIG. 4K depicts a view of example phase mask 150*d'* when viewed along axis 185 from hollow core optical fiber interfaces 110', 115', 160', and 165' when phase mask 150*d'* is assembled, e.g., within mux 105 or demux 155 of FIGS. 1A-3D. FIG. 4L depicts a view of example phase mask 150*d'* when viewed along direction arrows G-G in FIG. 4K. Where FIGS. 4H and 4I depict a series of smaller polygonal shapes arranged (or 3D printed) throughout the incident surface 195*c*, FIGS. 4K and 4L are directed to and depict a series of larger polygonal shapes, in this case, a series of ring-shaped reflective features arranged (or 3D printed) to reflect particular wavelengths of optical signals whose optical paths are directed (or diffracted) to corresponding ring-shaped reflective features by the diffraction grating.

As with the reflective features 190*a*-190*e* and 190*a'*-190*e'* of FIGS. 4B, 4C, 4E, and 4F, 3D printing of the reflective features 190*f*-190*h* and 190*f*-190*h'* on the phase mask 150*d* and 150*d'* (or 3D printing the phase masks 150*d* and 150*d'* themselves) enables rapid prototyping and iterative adjustment to optimize positions, arrangements, distance (or thickness) relative to incident surface 195*c* or 195*c'*, and/or surface orientation, contour, and/or configuration (such as shown and described below with respect to FIGS. 5A-5F) of the reflective features, to achieve desired phase shifting objectives for the mux/demux. For other optical applications, 3D printing of the reflective features on the phase masks 150*d* and 150*d'* (or 3D printing the phase masks 150*d* and 150*d'* themselves) allows for optimizing desired phase mask characteristics. In an example, as shown in FIG. 4I, reflective features 190*f* may each have a distance (or thickness) from the incident surface 195*c* that is greater than that of reflective features 190*g*, which in turn may each have a distance (or thickness) from the incident surface 195*c* that is greater than that of reflective features 190*h*. In another example, not shown, reflective features 190*f*-190*h* may have the same distance (or thickness) relative to the incident surface 195*c*. Although shown in FIG. 4I as having a flat surface, reflective features 190*f*-190*h* may have any suitable surface orientation, contour, and/or configuration, such as shown, e.g., in FIGS. 5A-5F.

While the "smaller" reflective features described herein may be designed to reflect one optical signal that is diffract by the diffraction grating, the "larger" reflective features may be designed to reflect two or more optical signals having either different polarizations and/or different wavelengths that have been diffracted by the diffraction grating. In this manner, for muxes/demuxes utilizing polarization diversity optics 130*a* or 130*b*, optical signals having polarizations that may be shifted "vertically" may be reflected without having to specifically determine which portion of the phase mask to position (or 3D print) smaller reflective features to reflect such diffracted polarization-shifted optical signals. Although each reflective feature corresponding to one of the reflective features 190*f*-190*h'* is shown to be ring-shaped, each reflective feature 190*f*-190*h'* may have any suitable polygonal shape and may be positioned (or 3D printed) at any suitable location on the incident surface 195*c'* of the phase mask 150*d'*. Reflective features 190*f*-190*h'*, incident surface 195*c'*, base or substrate 195*d'*, and/or phase mask 150*d'* are otherwise similar, or identical, to corresponding reflective features 190*f*-190*h*, incident surface 195*c*, base or substrate 195*d*, and/or phase mask 150*d*.

Although particular shapes, arrangements, and configurations are shown in FIGS. 4A-4L for features 190*a*-190*e* and 190*a'*-190*e'*, 1D and 2D arrays of hollow core optical fiber interfaces 110*a*-110*z*, 110', 115, 115', 160, 160', 165*a*-165*z*, and 165', and phase masks 150*c*, 150*c'*, 150*d*, and 150*d'*, the various embodiments are not so limited, and the features, 1D and 2D arrays, and phase masks may each be configured to have any suitable shape, arrangement, and configuration.

FIGS. 5A-5F depict various examples 500A-500F of (portions of) phase masks including various examples of reflective features that are used for implementing hollow core fiber DWDM applications. In some embodiments, 3D printed phase masks 150*e*-150*j*, reflective features 190*i*-190*x*, incident surfaces 195*e*, 195*g*, 195*i*, 195*k*, 195*m*, and 195*o*, and bases or substrates 195*f*, 195*h*, 195*j*, 195*l*, 195*n*, and 195*p* of FIGS. 5A-5F may be similar, if not identical, to 3D printed phase masks 150*c*, 150*c'*, 150*d*, and 150*d'*, reflective features 190*a*-190*h* and 190*a'*-190*h'*, incident surfaces 195*a*, 195*a'*, 195*c*, and 195*c'*, and bases or substrates 195*b*, 195*b'*, 195*d*, and 195*d'*, respectively, of example systems 400B, 400C, 400E, 400F, 400H, 400I, 400K, and 400L of FIGS. 4B, 4C, 4E, 4F, 4H, 4I, 4K, and 4L and the description of these components of example systems 400B, 400C, 400E, 400F, 400H, 400I, 400K, and 400L of FIGS. 4B, 4C, 4E, 4F, 4H, 4I, 4K, and 4L are similarly applicable to the corresponding components of FIGS. 5A-5F.

Figures 5A, 5B, 5C, 5D, 5E, 5F:
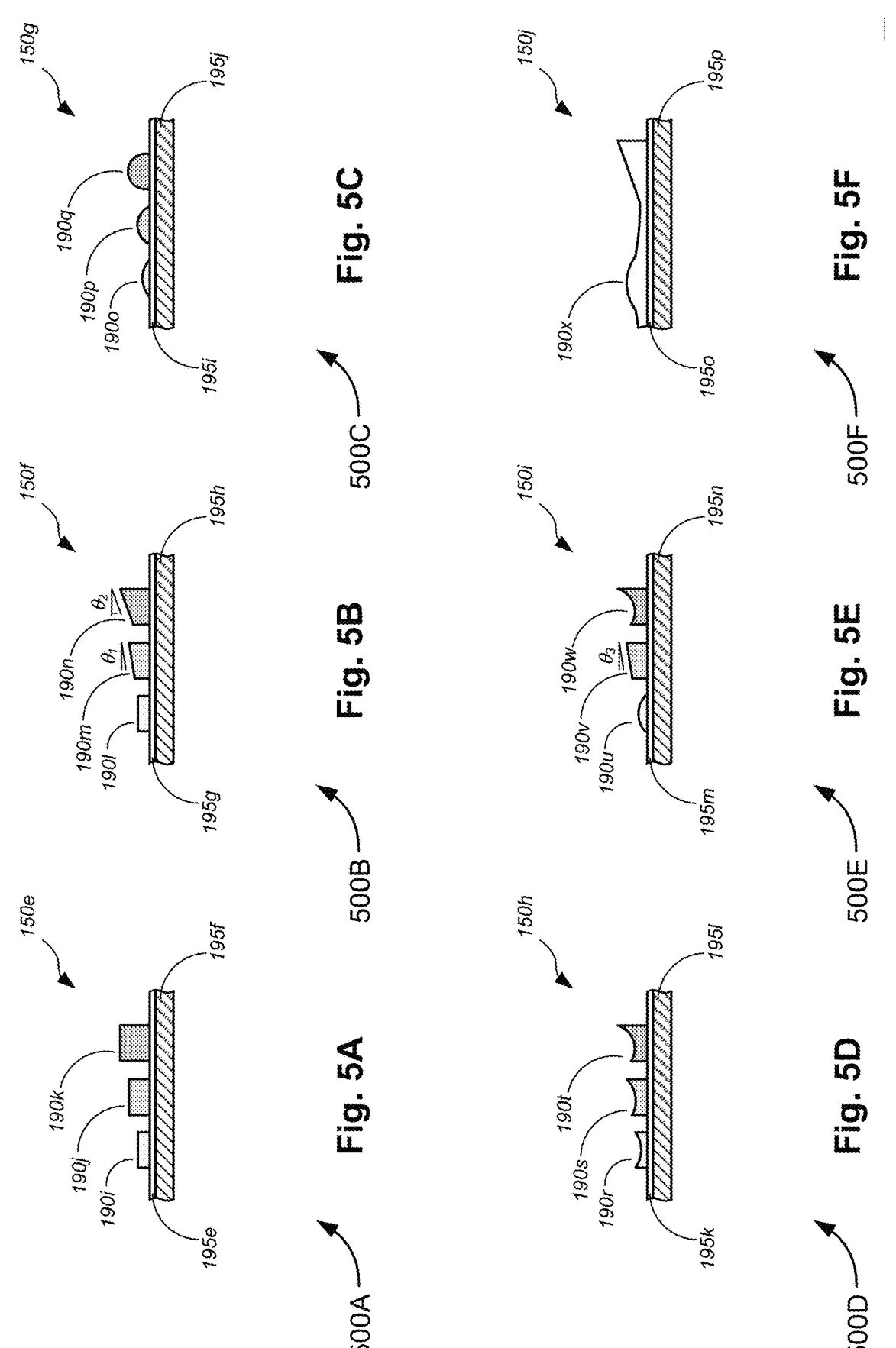
FIGS. 5A-5F depict various examples of phase masks including various examples of reflective features that are used for implementing hollow core fiber DWDM applications.

With reference to non-limiting example 500A of FIG. 5A, 3D printed phase mask 150*e* includes a plurality of reflective features 190*i*-190*k* that is at least one of arranged on, 3D printed on, set on, set in, or extended from incident surface 195*e* of base or substrate 195*f*. As shown in FIG. 5A, each reflective feature 190*i*-190*k* is a flat reflective surface that is parallel with the incident surface 195*e*. In some cases, similar to reflective features 190*a*/190*e*/190*a'*/190*e'*, 190*b*/190*d*/190*b'*/190*d'*, and 190*c*/190*c'*, reflective feature(s) 190*k* has a distance (or thickness) from the incident surface 195e that is greater than that of reflective feature(s) 190j, which in turn has a distance (or thickness) from the incident surface 195e that is greater than that of reflective feature(s) 190i. In another example, not shown, reflective features 190i-190k may have the same distance (or thickness) relative to the incident surface 195e. The reflective features may have relative distances (or thicknesses) with respect to each other that vary based on designed or determined use applications.

Referring to non-limiting example 500B of FIG. 5B, 3D printed phase mask 150f includes a plurality of reflective features 190l-190n that is at least one of arranged on, 3D printed on, set on, set in, or extended from incident surface 195g of base or substrate 195h. As shown in FIG. 5B, reflective feature 190l is a flat reflective surface that is parallel with the incident surface 195g (e.g., a reflective surface that is angled at 0° with respect to incident surface 195g), while each of reflective feature 190m and 190n is a slanted reflective surface that is angled (e.g., at angles $\theta_1$ and $\theta_2$, respectively) with respect to the incident surface 195g. In some cases, as in the non-limiting example 500A of FIG. 5A and similar to reflective features 190a/190e/190a'/190e', 190b/190d/190b'/190d', and 190c/190c', reflective feature(s) 190n has a peak or average distance (or thickness) from the incident surface 195g that is greater than that of reflective feature(s) 190m, which in turn has a peak or average distance (or thickness) from the incident surface 195g that is greater than that of reflective feature(s) 190l. In another example, not shown, reflective features 190l-190n may have the same peak or average distance (or thickness) relative to the incident surface 195g. For a slanted surface that is flat and rectangular or square in shape, yet angled with respect to incident surface 195g (such as reflective features 190m and 190n of FIG. 5B), the average distance (or thickness) from the incident surface 195g corresponds to a distance (or thickness) of a middle portion of the slanted surface relative to the incident surface 195g. The reflective features may have relative peak or average distances (or thicknesses) with respect to each other that vary based on designed or determined use applications.

Turning to non-limiting example 500C of FIG. 5C, 3D printed phase mask 150g includes a plurality of reflective features 190o-190q that is at least one of arranged on, 3D printed on, set on, set in, or extended from incident surface 195i of base or substrate 195j. As shown in FIG. 5C, each reflective feature 190o-190q is or includes a convex reflective surface extending from the incident surface 195i. In some cases, as in the non-limiting example 500A of FIG. 5A and similar to reflective features 190a/190e/190a'/190e', 190b/190d/190b'/190d', and 190c/190c', reflective feature(s) 190q has a peak or average distance (or thickness) from the incident surface 195i that is greater than that of reflective feature(s) 190p, which in turn has a peak or average distance (or thickness) from the incident surface 195i that is greater than that of reflective feature(s) 190o. In another example, not shown, reflective features 190o-190q may have the same peak or average distance (or thickness) relative to the incident surface 195i. The reflective features may have relative peak or average distances (or thicknesses) with respect to each other that vary based on designed or determined use applications.

With reference to non-limiting example 500D of FIG. 5D, 3D printed phase mask 150h includes a plurality of reflective features 190r-190t that is at least one of arranged on, 3D printed on, set on, set in, or extended from incident surface 195k of base or substrate 195l. As shown in FIG. 5D, each reflective feature 190r-190t is a concave reflective surface set on or in the incident surface 195k. In some cases, as in the non-limiting example 500A of FIG. 5A and similar to reflective features 190a/190e/190a'/190e', 190b/190d/190b'/190d', and 190c/190c', reflective feature(s) 190t has a peak or average distance (or thickness) from the incident surface 195k that is greater than that of reflective feature(s) 190s, which in turn has a peak or average distance (or thickness) from the incident surface 195k that is greater than that of reflective feature(s) 190r. In another example, not shown, reflective features 190r-190t may have the same peak or average distance (or thickness) relative to the incident surface 195k. The reflective features may have relative peak or average distances (or thicknesses) with respect to each other that vary based on designed or determined use applications.

Referring to non-limiting example 500E of FIG. 5E, 3D printed phase mask 150i includes a plurality of reflective features 190u-190w that is at least one of arranged on, 3D printed on, set on, set in, or extended from incident surface 195m of base or substrate 195n. In examples, reflective features 190u-190w include a combination of two or more of a flat reflective surface that is parallel with the incident surface 195m, a slanted reflective surface that is angled with respect to the incident surface 195m, a convex reflective surface extending from the incident surface 195m, a concave reflective surface set on or in the incident surface 195m, or a 3D polygonal reflective structure set on or in the incident surface 195m. As shown in FIG. 5E, reflective features 190u-190w include a combination of convex reflective surface 190u, slanted reflective surface 190v, and concave reflective surface 190w. In some cases, as in the non-limiting example 500A of FIG. 5A and similar to reflective features 190a/190e/190a'/190e', 190b/190d/190b'/190d', and 190c/190c', reflective feature(s) 190w has a peak or average distance (or thickness) from the incident surface 195m that is greater than that of reflective feature(s) 190v, which in turn has a peak or average distance (or thickness) from the incident surface 195m that is greater than that of reflective feature(s) 190u. In another example, not shown, reflective features 190u-190w may have the same peak or average distance (or thickness) relative to the incident surface 195m. The reflective features may have relative peak or average distances (or thicknesses) with respect to each other that vary based on designed or determined use applications.

Turning to non-limiting example 500F of FIG. 5F, 3D printed phase mask 150j includes at least one reflective feature 190x that is at least one of arranged on, 3D printed on, set on, set in, or extended from incident surface 195o of base or substrate 195p. In examples, the at least one reflective feature 190x is a 3D polygonal reflective structure set on or in the incident surface 195o. As shown in FIG. 5F, reflective feature 190x includes two or more multiple 3D polygonal reflective structures (e.g., one or more slanted reflective surfaces, one or more convex reflective surfaces, etc.) that are integrated or combined together as a singular 3D polygonal reflective structures. The reflective feature(s) 190x may have portions thereof that have relative peak or average distances (or thicknesses) with respect to each other that vary based on designed or determined use applications, and that, in some cases, have varying surface orientations, contours, and/or configurations.

As should be appreciated from the foregoing, the present technology provides multiple technical benefits and solutions to technical problems. For instance, multiplexers and demultiplexers used in hollow core optical fiber applications face several challenges. One significant issue is the limited power handling capability of conventional muxes and demuxes, as the materials used in these devices are typically not able to withstand high power levels. This can lead to signal degradation or even device failure. Additionally, conventional solutions often lack precise control over the phase and amplitude of light waves, resulting in suboptimal transmission quality in hollow core optical fibers. Another issue is the limited flexibility in designing these devices for different frequency grids or channel plans, as they typically rely on electronic or optical switching methods. The present technology provides a high-power mux/demux using a 3D-printed phase mask for hollow-core optical fiber applications. By utilizing a 3D printed phase mask made of superior-quality material, the power mux/demux enables higher power handling and precise control over the phase and amplitude of light waves. The power mux/demux incorporates a passive beam steering mechanism, ensuring greater reliability compared to active solutions (e.g., electronic or optical switching solutions). Additionally, the device offers a physical mechanism for switching between frequency grids by swapping 3D printed phase masks tailored to particular use applications, thus providing enhanced flexibility and precision in wavelength selection.

In an aspect, the technology relates to a high-power mux/demux, including a first hollow core optical fiber interface, a set of second hollow core optical fiber interfaces, a diffraction grating, a 3D printed phase mask, and a set of lenses. The first hollow core optical fiber interface is configured to couple with a first free-space optical fiber cable. The set of second hollow core optical fiber interfaces is configured to couple with a corresponding set of second free-space optical fiber cables. The diffraction grating is configured either to at least diffract each optical signal of a plurality of optical signals each having different wavelengths into two or more optical signals based on the different wavelengths or to at least diffract a single optical signal having multiple wavelengths into a plurality of optical signals based on different wavelengths. The 3D printed phase mask has an incident surface including a plurality of reflective features configured to reflect a corresponding plurality of optical signals having different wavelengths at different optical path lengths to provide the reflected corresponding plurality of optical signals with different phases. The set of lenses configured to collimate optical signals onto or from the diffraction grating; or focus optical signals onto or from the 3D printed phase mask.

In examples, the set of lenses includes one or more collimating lenses configured to collimate optical signals onto or from the diffraction grating; and one or more focusing lenses configured to focus optical signals onto or from the 3D printed phase mask. In some instances, the single incoming optical signal contains a multiplexed combination or optical signals having different polarizations, and the plurality of incoming optical signals has different polarizations. The high-power mux/demux further includes a polarization diversity optic configured either to separate the single incoming optical signal into different optical signals based on the different polarizations or to combine the plurality of optical signals having different polarizations into the single outgoing optical signal.

In some examples, the first hollow core optical fiber interface and the set of second hollow core optical fiber interfaces are aligned in a 1D array, with the first hollow core optical fiber interface being positioned in a middle portion of the 1D array and surrounded on each side by one or more second hollow core optical fiber interfaces among the set of second hollow core optical fiber interfaces. In some instances, in a mux mode, two or more of the set of second free-space optical fiber cables transmit the plurality of incoming optical signals through corresponding two or more of the set of second hollow core optical fiber interfaces. One or more first lenses among the set of lenses and the diffraction grating collimate and focus the plurality of incoming optical signals onto the 3D printed phase mask. The 3D printed phase mask reflects the plurality of incoming optical signals at different optical path lengths to provide the reflected plurality of incoming optical signals with different phases. One or more second lenses among the set of lenses focus the reflected plurality of incoming optical signals with different phases onto the diffraction grating. The diffraction grating diffracts the reflected plurality of incoming optical signals with different phases into the single outgoing optical signal, which is collimated and focused onto the first hollow core optical fiber interface by one or more third lenses among the set of lenses for transmission through the first free-space optical fiber cable.

In some cases, in a demux mode, the first free-space optical fiber cable transmits the single incoming optical signal through the first hollow core optical fiber interface, the single incoming optical signal being collimated onto the diffraction grating by one or more first lenses among the set of lenses. The diffraction grating diffracts the single incoming optical signal into the plurality of outgoing optical signals that is focused onto the 3D printed phase mask by one or more second lenses among the set of lenses. The 3D printed phase mask reflects the corresponding plurality of outgoing optical signals at different optical path lengths to provide the reflected corresponding plurality of optical signals with different phases. The diffraction grating and the set of lenses focus the reflected corresponding plurality of optical signals onto two or more of the set of second hollow core optical fiber interfaces based on wavelength and phase for transmission through corresponding two or more of the set of second free-space optical fiber cables.

In examples, the first hollow core optical fiber interface and the set of second hollow core optical fiber interfaces are aligned in a 2D array, with the first hollow core optical fiber interface being positioned in a middle portion of the 2D array and surrounded on each side by one or more second hollow core optical fiber interfaces among the set of second hollow core optical fiber interfaces.

In another aspect, the technology relates to a high-power optical transport mux/demux node, including a first hollow core optical fiber interface, a set of second hollow core optical fiber interfaces, a diffraction grating, a polarization diversity optic, a 3D printed phase mask, one or more collimating lenses, and one or more focusing lenses. The first hollow core optical fiber interface is configured to couple with a first free-space optical fiber cable. The set of second hollow core optical fiber interfaces is configured to couple with a corresponding set of second free-space optical fiber cables. The diffraction grating is configured either to diffract a single incoming optical signal having multiple wavelengths into a plurality of outgoing optical signals based on different wavelengths or to diffract a plurality of incoming optical signals having different wavelengths into a single outgoing optical signal having multiple wavelengths. The single incoming optical signal contains a multiplexed combination or optical signals having different polarizations, wherein the plurality of incoming optical signals has different polarizations. The polarization diversity optic is configured either to separate the single incoming optical signal into different optical signals based on the different polarizations or to combine the plurality of optical signals into the single outgoing optical signal. The 3D printed phase mask has an incident surface including a plurality of reflective features configured to reflect a corresponding plurality of optical signals having different wavelengths at different optical path lengths to provide the reflected corresponding plurality of optical signals with different phases. The one or more collimating lenses are configured to collimate optical signals onto or from the diffraction grating. The one or more focusing lenses are configured to focus optical signals onto or from the 3D printed phase mask.

In examples, the first hollow core optical fiber interface and the set of second hollow core optical fiber interfaces are aligned in a 1D array, with the first hollow core optical fiber interface positioned in a middle portion of the 1D array and surrounded on each side by one or more second hollow core optical fiber interfaces among the set of second hollow core optical fiber interfaces. In some instances, the plurality of reflective features of the 3D printed phase mask includes a series of reflective features each extending from the incident surface along a direction that is perpendicular to the incident surface with adjacent reflective features that are at least one of set at different distances from the incident surface relative to each other or configured to reflect optical signals at different angles with respect to the incident surface relative to each other. Each reflective feature among the plurality of reflective features has at least one of a flat reflective surface that is parallel with the incident surface, a slanted reflective surface that is angled with respect to the incident surface, a convex reflective surface extending from the incident surface, a concave reflective surface set on or in the incident surface, or a 3D polygonal reflective structure set on or in the incident surface.

In some examples, the first hollow core optical fiber interface and the set of second hollow core optical fiber interfaces are aligned in a 2D array, with the first hollow core optical fiber interface positioned in a middle portion of the 2D array and surrounded on each side by one or more second hollow core optical fiber interfaces among the set of second hollow core optical fiber interfaces. In some cases, the plurality of reflective features of the 3D printed phase mask includes a series of reflective features each extending from the incident surface along a direction that is perpendicular to the incident surface with reflective features that are disposed radially outward from a central portion of the 3D printed phase mask being at least one of set at different distances from the incident surface relative to adjacent radially disposed reflective features or configured to reflect optical signals at different angles with respect to the incident surface relative to adjacent radially disposed reflective features. Each reflective feature among the plurality of reflective features has at least one of a flat reflective surface that is parallel with the incident surface, a slanted reflective surface that is angled with respect to the incident surface, a convex reflective surface extending from the incident surface, a concave reflective surface set on or in the incident surface, or a 3D polygonal reflective structure set on or in the incident surface.

In an example, in a mux mode, two or more of the set of second free-space optical fiber cables transmit the plurality of incoming optical signals through corresponding two or more of the set of second hollow core optical fiber interfaces. The one or more collimating lenses, the one or more focusing lenses, and the diffraction grating collimate and focus the plurality of incoming optical signals onto the 3D printed phase mask. The 3D printed phase mask reflects the plurality of incoming optical signals at different optical path lengths to provide the reflected plurality of incoming optical signals with different phases. The one or more focusing lenses focus the reflected plurality of incoming optical signals with different phases onto the diffraction grating. The diffraction grating diffracts the reflected plurality of incoming optical signals with different phases into the single outgoing optical signal, which is collimated and focused onto the first hollow core optical fiber interface by the one or more collimating lenses for transmission through the first free-space optical fiber cable.

In some cases, the plurality of incoming optical signals propagates along a first plane that is perpendicular to an incident surface of the diffraction grating. The plurality of incoming optical signals is each separated by the polarization diversity optic into the different incoming optical signals, based on the different polarizations. The different incoming optical signals propagating along the first plane, prior to being collimated onto the diffraction grating that diffracts each different incoming optical signal into a plurality of optical signals, based on wavelength, along a second plane that is perpendicular to each of the first plane and the incident surface of the diffraction grating. The plurality of optical signals is focused onto the 3D printed phase mask by the one or more focusing lenses. As the reflected plurality of incoming optical signals with different phases is combined into the single outgoing optical signal, the different incoming optical signals that are reflected by the 3D printed phase mask are combined into the single outgoing optical signal by the polarization diversity optic.

In another example, in a demux mode, the first free-space optical fiber cable transmits the single incoming optical signal through the first hollow core optical fiber interface, the single incoming optical signal being collimated onto the diffraction grating by the one or more collimating lenses. The diffraction grating diffracts the single incoming optical signal into a plurality of optical signals that is focused onto the 3D printed phase mask by the one or more focusing lenses. the 3D printed phase mask reflects the corresponding plurality of optical signals at different optical path lengths to provide the reflected corresponding plurality of optical signals with different phases. The diffraction grating, the one or more focusing lenses, and the one or more collimating lenses focus the reflected corresponding plurality of optical signals as two or more outgoing optical signals onto two or more of the set of second hollow core optical fiber interfaces based on wavelength and phase for transmission through corresponding two or more of the set of second free-space optical fiber cables.

In some instances, the single incoming optical signal is separated by the polarization diversity optic into the different incoming optical signals, based on the different polarizations. The different incoming optical signals propagate along a first plane that is perpendicular to an incident surface of the diffraction grating, prior to being collimated onto the diffraction grating that diffracts each different incoming optical signal into a plurality of optical signals, based on wavelength, along a second plane that is perpendicular to each of the first plane and the incident surface of the diffraction grating. The plurality of optical signals is focused onto the 3D printed phase mask by the one or more focusing lenses. After being reflected by the 3D printed phase mask, each set of two or more of the different incoming optical signals having similar phase are merged together into one of the two or more outgoing optical signals by the polarization diversity optic, prior to being focused onto a corresponding one of the two or more of the set of second hollow core optical fiber interfaces.

In yet another aspect, the technology relates to a 3D printed phase mask, including an incident surface that is perpendicular to at least one plane along which optical signals propagate prior to reaching the incident surface; and a plurality of reflective features that is 3D printed on or below the incident surface. The plurality of reflective features includes one or more reflective features, each reflective feature extending from, set on, or set in the incident surface along a direction that is perpendicular to the incident surface. Adjacent reflective features are at least one of set at different distances from the incident surface relative to each other or configured to reflect optical signals at different angles with respect to the incident surface relative to each other, such that optical signals having different wavelengths are reflected from the reflective features at different optical path lengths to provide reflected optical signals with different phases.

In some examples, the 3D printed phase mask is part of a high-power mux/demux. In an example, a single optical signal that is received by a first hollow core optical fiber interface is separated by a transmission grating of the high-power mux/demux and subsequently reflected by the 3D printed phase mask to be focused onto two or more of the set of second hollow core optical fiber interfaces based on wavelength and phase. In another example, two or more optical signals that are received by the two or more of the set of second hollow core optical fiber interfaces are reflected by the 3D printed phase mask with different phases to be combined into an optical signal that is collimated and focused onto the first hollow core optical fiber interface by one or more collimating lenses.

In examples, each reflective feature among the plurality of reflective features has at least one of a flat reflective surface that is parallel with the incident surface, a slanted reflective surface that is angled with respect to the incident surface, a convex reflective surface extending from the incident surface, a concave reflective surface set on or in the incident surface, or a 3D polygonal reflective structure set on or in the incident surface. In some examples, the 3D printed phase mask further includes a central portion. In some cases, the plurality of reflective features is arranged in a pattern of at least one of different distances from the incident surface, angles of reflective features, or shapes of reflective features, the pattern being symmetrical extending from the central portion along one of a 1D direction or a 2D direction.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n" may be used, where n denotes any suitable integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A high-power multiplexer/demultiplexer ("mux/demux"), comprising:

a first hollow core optical fiber interface configured to couple with a first free-space optical fiber cable;

a set of second hollow core optical fiber interfaces configured to couple with a corresponding set of second free-space optical fiber cables;

a diffraction grating configured either to at least diffract each optical signal of a plurality of incoming optical signals each having different wavelengths into two or more optical signals based on the different wavelengths or to at least diffract a single incoming optical signal having multiple wavelengths into a plurality of optical signals based on different wavelengths;

a three-dimensional ("3D") printed phase mask having an incident surface including a plurality of reflective features configured to reflect a corresponding plurality of optical signals having different wavelengths at different optical path lengths to provide the reflected corresponding plurality of optical signals with different phases; and a set of lenses configured to:

collimate optical signals onto or from the diffraction grating; or focus optical signals onto or from the 3D printed phase mask.

2. The high-power mux/demux of claim 1, wherein the set of lenses comprises:

one or more collimating lenses configured to collimate optical signals onto or from the diffraction grating; and one or more focusing lenses configured to focus optical signals onto or from the 3D printed phase mask.

3. The high-power mux/demux of claim 1, wherein the single incoming optical signal contains a multiplexed combination or optical signals having different polarizations, wherein the plurality of incoming optical signals has different polarizations, wherein the high-power mux/demux further comprises:

a polarization diversity optic configured either to separate the single incoming optical signal into different optical signals based on the different polarizations or to combine the plurality of optical signals having different polarizations into a single outgoing optical signal.

4. The high-power mux/demux of claim 1, wherein the first hollow core optical fiber interface and the set of second hollow core optical fiber interfaces are aligned in a one-dimensional ("1D") array, with the first hollow core optical fiber interface being positioned in a middle portion of the 1D array and surrounded on each side by one or more second hollow core optical fiber interfaces among the set of second hollow core optical fiber interfaces.

5. The high-power mux/demux of claim 4, wherein, in a mux mode, two or more of the set of second free-space optical fiber cables transmit the plurality of incoming optical signals through corresponding two or more of the set of second hollow core optical fiber interfaces, wherein one or more first lenses among the set of lenses and the diffraction grating collimate and focus the plurality of incoming optical signals onto the 3D printed phase mask, wherein the 3D printed phase mask reflects the plurality of incoming optical signals at different optical path lengths to provide the reflected plurality of incoming optical signals with different phases, wherein one or more second lenses among the set of lenses focus the reflected plurality of incoming optical signals with different phases onto the diffraction grating, wherein the diffraction grating diffracts the reflected plurality of incoming optical signals with different phases into the single outgoing optical signal, which is collimated and focused onto the first hollow core optical fiber interface by one or more third lenses among the set of lenses for transmission through the first free-space optical fiber cable.

6. The high-power mux/demux of claim 4, wherein, in a demux mode, the first free-space optical fiber cable transmits the single incoming optical signal through the first hollow core optical fiber interface, the single incoming optical signal being collimated onto the diffraction grating by one or more first lenses among the set of lenses, wherein the diffraction grating diffracts the single incoming optical signal into the plurality of outgoing optical signals that is focused onto the 3D printed phase mask by one or more second lenses among the set of lenses, wherein the 3D printed phase mask reflects the corresponding plurality of outgoing optical signals at different optical path lengths to provide the reflected corresponding plurality of optical signals with different phases, wherein the diffraction grating and the set of lenses focus the reflected corresponding plurality of optical signals onto two or more of the set of second hollow core optical fiber interfaces based on wavelength and phase for transmission through corresponding two or more of the set of second free-space optical fiber cables.

7. The high-power mux/demux of claim 1, wherein the first hollow core optical fiber interface and the set of second hollow core optical fiber interfaces are aligned in a two-dimensional ("2D") array, with the first hollow core optical fiber interface being positioned in a middle portion of the 2D array and surrounded on each side by one or more second hollow core optical fiber interfaces among the set of second hollow core optical fiber interfaces.

8. A high-power optical transport multiplexer/demultiplexer ("mux/demux") node, comprising:

a first hollow core optical fiber interface configured to couple with a first free-space optical fiber cable;

a set of second hollow core optical fiber interfaces configured to couple with a corresponding set of second free-space optical fiber cables;

a diffraction grating configured either to diffract a single incoming optical signal having multiple wavelengths into a plurality of outgoing optical signals based on different wavelengths or to diffract a plurality of incoming optical signals having different wavelengths into a single outgoing optical signal having multiple wavelengths, wherein the single incoming optical signal contains a multiplexed combination or optical signals having different polarizations, wherein the plurality of incoming optical signals has different polarizations;

a polarization diversity optic configured either to separate the single incoming optical signal into different optical signals based on the different polarizations or to combine the plurality of optical signals into the single outgoing optical signal;

a three-dimensional ("3D") printed phase mask having an incident surface including a plurality of reflective features configured to reflect a corresponding plurality of optical signals having different wavelengths at different optical path lengths to provide the reflected corresponding plurality of optical signals with different phases;

one or more collimating lenses configured to collimate optical signals onto or from the diffraction grating; and one or more focusing lenses configured to focus optical signals onto or from the 3D printed phase mask.

9. The high-power optical transport mux/demux node of claim 8, wherein the first hollow core optical fiber interface and the set of second hollow core optical fiber interfaces are aligned in a one-dimensional ("1D") array, with the first hollow core optical fiber interface positioned in a middle portion of the 1D array and surrounded on each side by one or more second hollow core optical fiber interfaces among the set of second hollow core optical fiber interfaces.

10. The high-power optical transport mux/demux node of claim 9, wherein the plurality of reflective features of the 3D printed phase mask comprises a series of reflective features each extending from the incident surface along a direction that is perpendicular to the incident surface with adjacent reflective features that are at least one of set at different distances from the incident surface relative to each other or configured to reflect optical signals at different angles with respect to the incident surface relative to each other, wherein each reflective feature among the plurality of reflective features has at least one of a flat reflective surface that is parallel with the incident surface, a slanted reflective surface that is angled with respect to the incident surface, a convex reflective surface extending from the incident surface, a concave reflective surface set on or in the incident surface, or a 3D polygonal reflective structure set on or in the incident surface.

11. The high-power optical transport mux/demux node of claim 8, wherein the first hollow core optical fiber interface and the set of second hollow core optical fiber interfaces are aligned in a two-dimensional ("2D") array, with the first hollow core optical fiber interface positioned in a middle portion of the 2D array and surrounded on each side by one or more second hollow core optical fiber interfaces among the set of second hollow core optical fiber interfaces.

12. The high-power optical transport mux/demux node of claim 11, wherein the plurality of reflective features of the 3D printed phase mask comprises a series of reflective features each extending from the incident surface along a direction that is perpendicular to the incident surface with reflective features that are disposed radially outward from a central portion of the 3D printed phase mask being at least one of set at different distances from the incident surface relative to adjacent radially disposed reflective features or configured to reflect optical signals at different angles with respect to the incident surface relative to adjacent radially disposed reflective features, wherein each reflective feature among the plurality of reflective features has at least one of a flat reflective surface that is parallel with the incident surface, a slanted reflective surface that is angled with respect to the incident surface, a convex reflective surface extending from the incident surface, a concave reflective surface set on or in the incident surface, or a 3D polygonal reflective structure set on or in the incident surface.

13. The high-power optical transport mux/demux node of claim 8, wherein, in a mux mode, two or more of the set of second free-space optical fiber cables transmit the plurality of incoming optical signals through corresponding two or more of the set of second hollow core optical fiber interfaces, wherein the one or more collimating lenses, the one or more focusing lenses, and the diffraction grating collimate and focus the plurality of incoming optical signals onto the 3D printed phase mask, wherein the 3D printed phase mask reflects the plurality of incoming optical signals at different optical path lengths to provide the reflected plurality of incoming optical signals with different phases, wherein the one or more focusing lenses focus the reflected plurality of incoming optical signals with different phases onto the diffraction grating, wherein the diffraction grating diffracts the reflected plurality of incoming optical signals with different phases into the single outgoing optical signal, which is collimated and focused onto the first hollow core optical fiber interface by the one or more collimating lenses for transmission through the first free-space optical fiber cable.

14. The high-power optical transport mux/demux node of claim 13, wherein the plurality of incoming optical signals propagates along a first plane that is perpendicular to an incident surface of the diffraction grating, wherein the plurality of incoming optical signals is each separated by the polarization diversity optic into the different incoming optical signals, based on the different polarizations, the different incoming optical signals propagating along the first plane, prior to being collimated onto the diffraction grating that diffracts each different incoming optical signal into a plurality of optical signals, based on wavelength, along a second plane that is perpendicular to each of the first plane and the incident surface of the diffraction grating, the plurality of optical signals being focused onto the 3D printed phase mask by the one or more focusing lenses, wherein as the reflected plurality of incoming optical signals with different phases is combined into the single outgoing optical signal, the different incoming optical signals that are reflected by the 3D printed phase mask are combined into the single outgoing optical signal by the polarization diversity optic.

15. The high-power optical transport mux/demux node of claim 8, wherein, in a demux mode, the first free-space optical fiber cable transmits the single incoming optical signal through the first hollow core optical fiber interface, the single incoming optical signal being collimated onto the diffraction grating by the one or more collimating lenses, wherein the diffraction grating diffracts the single incoming optical signal into a plurality of optical signals that is focused onto the 3D printed phase mask by the one or more focusing lenses, wherein the 3D printed phase mask reflects the corresponding plurality of optical signals at different optical path lengths to provide the reflected corresponding plurality of optical signals with different phases, wherein the diffraction grating, the one or more focusing lenses, and the one or more collimating lenses focus the reflected corresponding plurality of optical signals as two or more outgoing optical signals onto two or more of the set of second hollow core optical fiber interfaces based on wavelength and phase for transmission through corresponding two or more of the set of second free-space optical fiber cables.

16. The high-power optical transport mux/demux node of claim 15, wherein the single incoming optical signal is separated by the polarization diversity optic into the different incoming optical signals, based on the different polarizations, wherein the different incoming optical signals propagate along a first plane that is perpendicular to an incident surface of the diffraction grating, prior to being collimated onto the diffraction grating that diffracts each different incoming optical signal into a plurality of optical signals, based on wavelength, along a second plane that is perpendicular to each of the first plane and the incident surface of the diffraction grating, the plurality of optical signals being focused onto the 3D printed phase mask by the one or more focusing lenses, wherein, after being reflected by the 3D printed phase mask, each set of two or more of the different incoming optical signals having similar phase are merged together into one of the two or more outgoing optical signals by the polarization diversity optic, prior to being focused onto a corresponding one of the two or more of the set of second hollow core optical fiber interfaces.

17. A three-dimensional ("3D") printed phase mask, comprising:

an incident surface that is perpendicular to at least one plane along which optical signals propagate prior to reaching the incident surface; and a plurality of reflective features that is 3D printed on or below the incident surface, the plurality of reflective features including one or more reflective features, each reflective feature extending from, set on, or set in the incident surface along a direction that is perpendicular to the incident surface, wherein adjacent reflective features are at least one of set at different distances from the incident surface relative to each other or configured to reflect optical signals at different angles with respect to the incident surface relative to each other, such that optical signals having different wavelengths are reflected from the reflective features at different optical path lengths to provide reflected optical signals with different phases.

18. The 3D printed phase mask of claim 17, wherein the 3D printed phase mask is part of a high-power multiplexer/demultiplexer ("mux/demux"), in which one of:

a single optical signal that is received by a first hollow core optical fiber interface is separated by a transmission grating of the high-power mux/demux and subsequently reflected by the 3D printed phase mask to be focused onto two or more of the set of second hollow core optical fiber interfaces based on wavelength and phase; or two or more optical signals that are received by the two or more of the set of second hollow core optical fiber interfaces are reflected by the 3D printed phase mask with different phases to be combined into an optical signal that is collimated and focused onto the first hollow core optical fiber interface by one or more collimating lenses.

19. The 3D printed phase mask of claim 17, wherein each reflective feature among the plurality of reflective features has at least one of a flat reflective surface that is parallel with the incident surface, a slanted reflective surface that is angled with respect to the incident surface, a convex reflective surface extending from the incident surface, a concave reflective surface set on or in the incident surface, or a 3D polygonal reflective structure set on or in the incident surface.

20. The 3D printed phase mask of claim 17, further comprising:

a central portion;

wherein the plurality of reflective features is arranged in a pattern of at least one of different distances from the incident surface, angles of reflective features, or shapes of reflective features, the pattern being symmetrical extending from the central portion along one of a one-dimensional ("1D") direction or a two-dimensional ("2D") direction.

\* \* \* \* \*